(12) United States Patent
Ohki

(10) Patent No.: US 9,361,703 B2
(45) Date of Patent: Jun. 7, 2016

(54) IMAGE PROCESSING DEVICE, CONTROL METHOD OF IMAGE PROCESSING DEVICE AND PROGRAM

(71) Applicant: SONY CORPORATION, Tokyo (JP)

(72) Inventor: Mitsuharu Ohki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/381,874

(22) PCT Filed: Feb. 22, 2013

(86) PCT No.: PCT/JP2013/054557
§ 371 (c)(1),
(2) Date: Aug. 28, 2014

(87) PCT Pub. No.: WO2013/150829
PCT Pub. Date: Oct. 10, 2013

(65) Prior Publication Data
US 2015/0043786 A1    Feb. 12, 2015

(30) Foreign Application Priority Data

Apr. 3, 2012   (JP) .................. 2012-084964
Jan. 8, 2013   (JP) .................. 2013-000990

(51) Int. Cl.
*G06T 7/20* (2006.01)
*H04N 5/232* (2006.01)
(Continued)

(52) U.S. Cl.
CPC .............. *G06T 7/2006* (2013.01); *G06T 5/002* (2013.01); *G06T 11/00* (2013.01); *H04N 5/144* (2013.01); *H04N 5/23254* (2013.01); *G06T 2207/10016* (2013.01); *G06T 2207/20148* (2013.01); *G06T 2207/20182* (2013.01); *G06T 2207/20201* (2013.01)

(58) Field of Classification Search
USPC .................................................. 382/107, 285
See application file for complete search history.

(56) References Cited

U.S. PATENT DOCUMENTS 6,862,374 B1 *  3/2005  Nagai ................. G06T 17/00
                                                      382/285

FOREIGN PATENT DOCUMENTS

JP      2003-37767 A    2/2003
JP     2010-273183 A   12/2010
(Continued)

OTHER PUBLICATIONS

International Search Report issued May 28, 2013 in PCT/JP2013/054557.

(Continued)

*Primary Examiner* — Duy M Dang
(74) *Attorney, Agent, or Firm* — Chip Law Group; Pramod Chintalapoodi

(57) ABSTRACT

A dynamic image is generated. An image processing device includes a moving object acquisition unit, a moving direction acquisition unit, a rear region detection unit, and a smoothing processing unit. The moving object acquisition unit acquires a region of a moving object in a target image which is at least one image among a plurality of images which are temporally consecutive. The moving direction acquisition unit acquires a moving direction of the moving object. The rear region detection unit detects a region of a rear portion with respect to the moving direction in the region of the moving object, as a rear region. The rear region processing unit performs a predetermined image process on the rear region.

19 Claims, 29 Drawing Sheets

(51) Int. Cl.
*G06T 5/00* (2006.01)
*G06T 11/00* (2006.01)
*H04N 5/14* (2006.01)

(56) References Cited

FOREIGN PATENT DOCUMENTS

| JP | 2011-170402 A | 9/2011 |
|---|---|---|
| JP | 2011-182213 A | 9/2011 |

OTHER PUBLICATIONS

Yoshikazu Takeuchi, et al., "Add Motions to the Character in the Perspective Drawing" GIMP Master Guide, CAD & CG Magazine, vol. 10, No. 5, May 2008, pp. 2.

* cited by examiner

FIG. 7
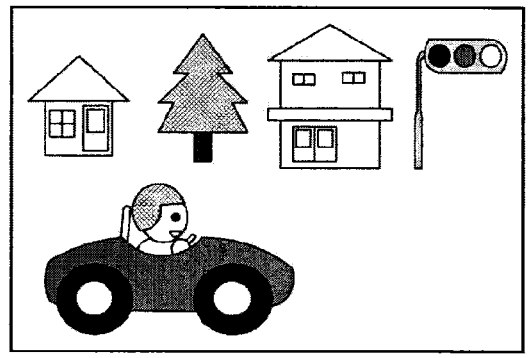
a
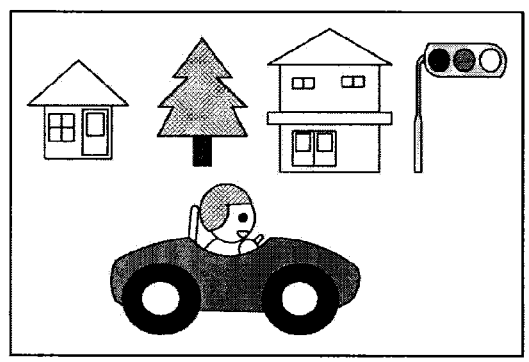
b
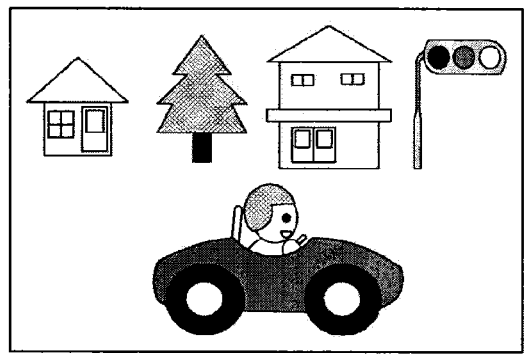
c
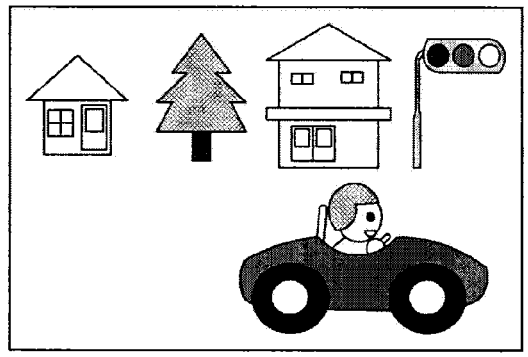
d

FIG. 9
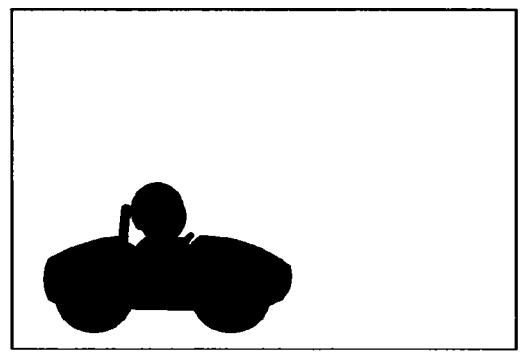
a
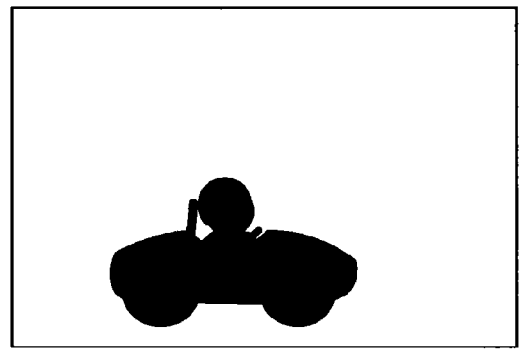
b
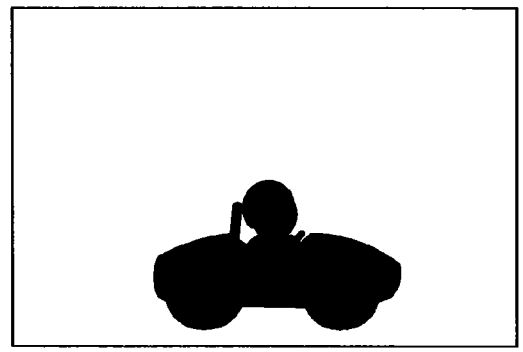
c
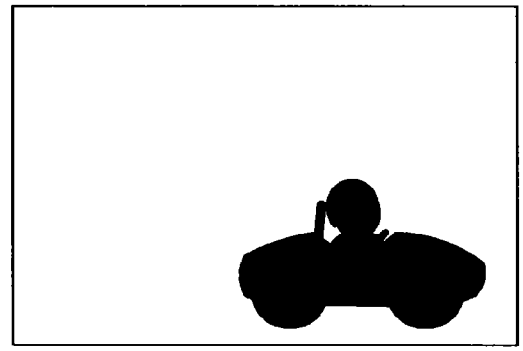
d

FIG. 14
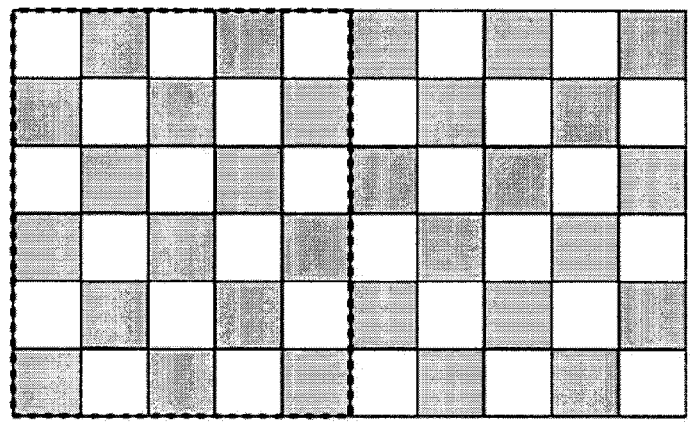
a ⇒ V₁
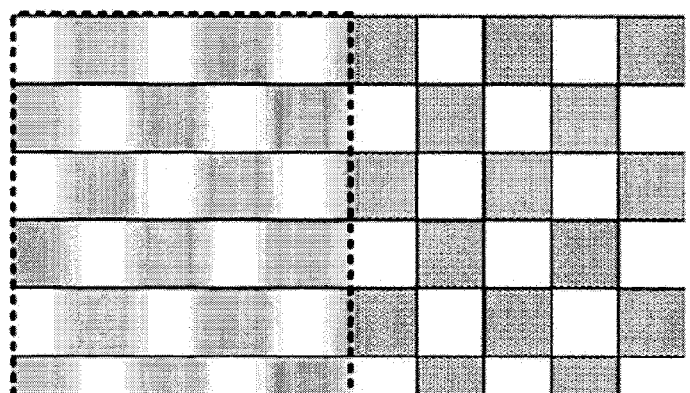
b ⇒ V₁
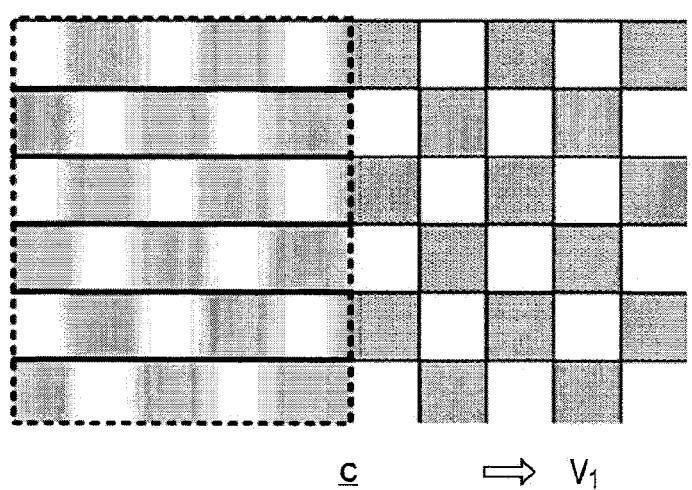
c ⇒ V₁

FIG. 21
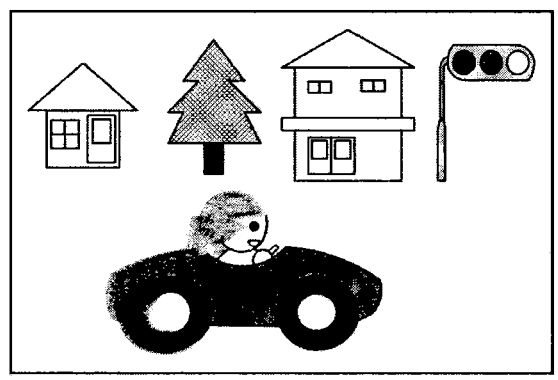
a
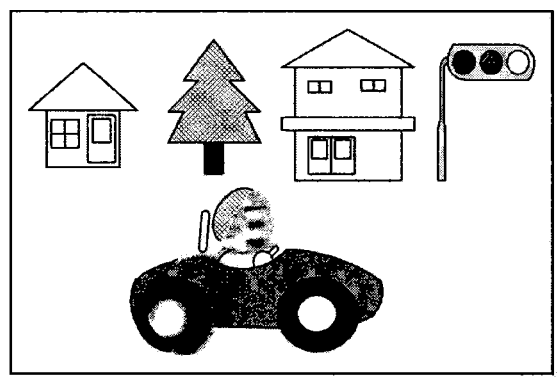
b
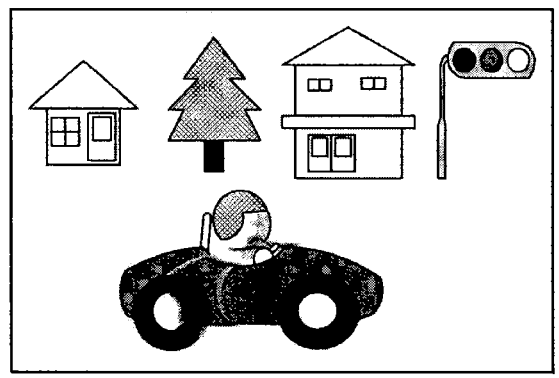
c

FIG. 26
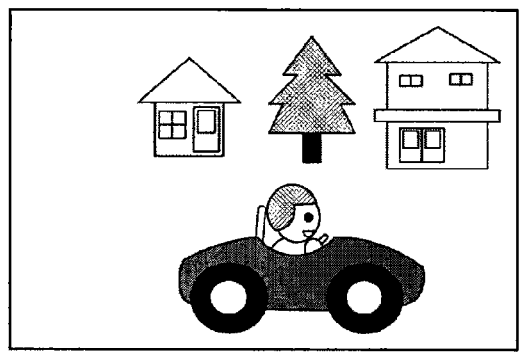
a
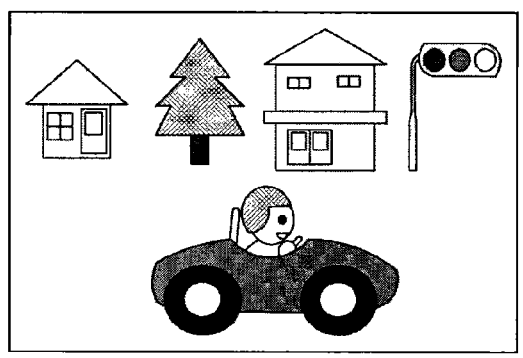
b
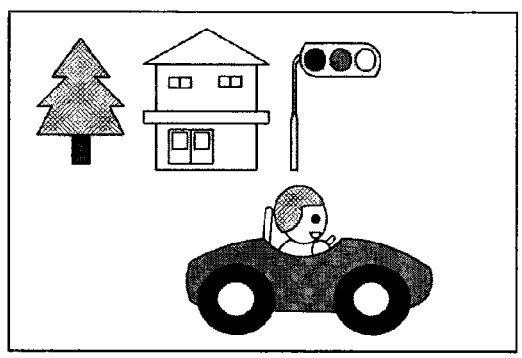
c
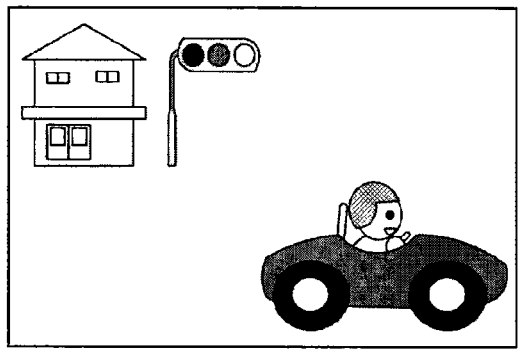
d

FIG. 29
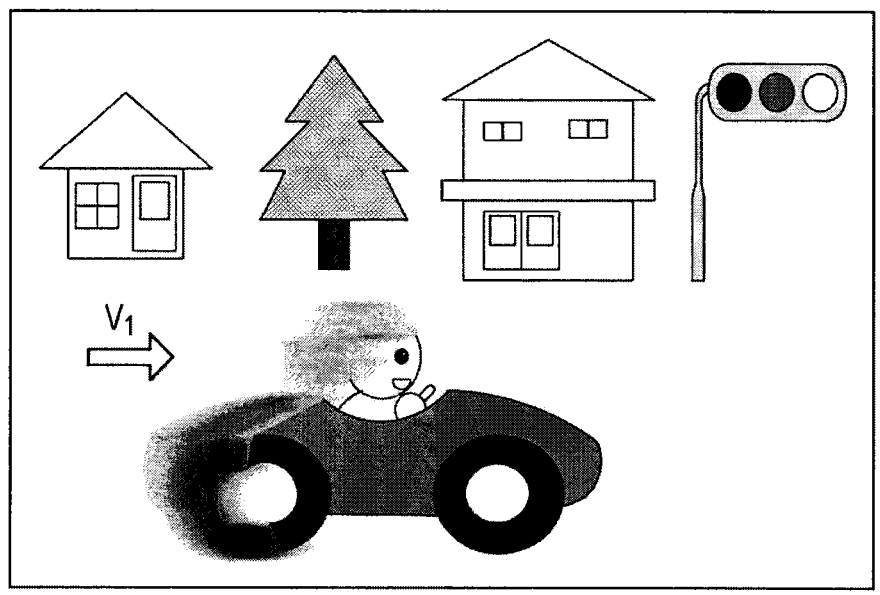
a
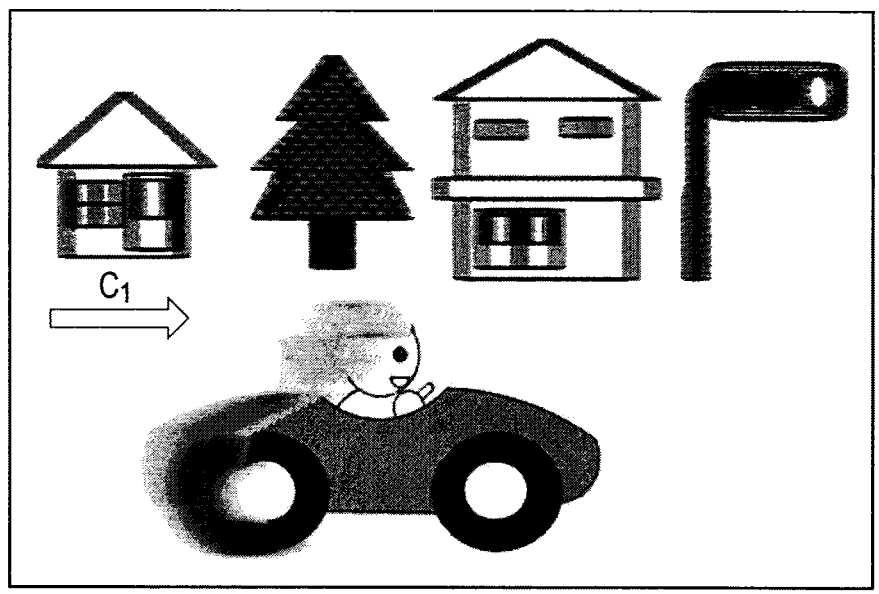
b

IMAGE PROCESSING DEVICE, CONTROL METHOD OF IMAGE PROCESSING DEVICE AND PROGRAM

TECHNICAL FIELD

The present invention relates to an image processing device, a control method thereof, and a program for causing a computer to execute the method. Specifically, the present invention relates an image processing device which performs a smoothing process, a control method thereof, and a program for causing a computer to execute the method.

BACKGROUND ART

In general, image processing devices perform various image processes on images captured by imaging equipment. For example, technologies have been proposed in which image processing devices select images in a moving image and change the style of painting of the selected images to a painterly style (see PTL 1 and PTL 2). Further, a technology has been proposed in which an image processing device detects a distance to a subject and performs a blurring process (in other words, a smoothing process) on an image to a degree depending on the distance (for example, see PTL 3).

CITATION LIST

Patent Literature

PTL 1: Japanese Unexamined Patent Application Publication No. 2011-170402
PTL 2: Japanese Unexamined Patent Application Publication No. 2011-182213
PTL 3: Japanese Unexamined Patent Application Publication No. 2003-037767

SUMMARY OF INVENTION

Technical Problem

However, in the related art described above, it has been difficult to generate dynamic images. During the capturing of an image of a moving object, a photographer captures an image in which a sensation of speed and a powerful movement of the moving object are expressed by adjusting a shutter speed or the like to make blur occur in some parts of the image. In the related technologies described above, it is difficult to generate a dynamic image from the captured image without using such imaging methods.

The present technology has been made in view of such a circumstance, and an object is to generate a dynamic image.

Solution to Problem

The present technology has been made to solve the problems described above, and a first aspect is an image processing device, a control method thereof, and a program for causing a computer to execute the method, in which the image processing device includes a moving object acquisition unit that acquires a region of a moving object in a target image which is at least one image among a plurality of images which are temporally consecutive; a moving direction acquisition unit that acquires a moving direction of the moving object; a rear region detection unit that detects a region of a rear portion with respect to the moving direction in the region of the moving object, as a rear region; and a rear region processing unit that performs a predetermined image process on the rear region. Thus, it is possible to achieve an effect of performing a smoothing process on the rear region of the moving object along the moving direction.

Further, in the first aspect, the moving object acquisition unit may detect the region of the moving object in the target image. This results in an effect of detecting a rear region in the target image.

Further, in the first aspect, the target image includes a plurality of blocks of a predetermined shape, and the moving object acquisition unit may obtain a movement amount of the block for each block using a block matching algorithm and detect a region configured with blocks each of which the movement amount exceeds a predetermined threshold, as the region of the moving object. This results in an effect of detecting the region configured with blocks each of which the movement amount exceeds the predetermined threshold as the region of the moving object.

Further, in the first aspect, the moving object acquisition unit may further acquire the region of the moving object in a reference image which is the immediately preceding image with respect to the target image among the plurality of images, and the moving direction acquisition unit may detect a direction from specific coordinates within the region of the moving object in the reference image to specific coordinates within the region of the moving object in the target image, as the moving direction. This results in an effect of detecting the region of the rear portion with respect to the detected moving direction in the moving object, as the rear region.

Further, in the first aspect, the rear region detection unit may detect a region surrounded by an outline of the rear portion of which a position is changed within the target image in the moving direction and the outline before the change, as the rear region. This results in an effect of detecting the region surrounded by the outline before and after the movement as the rear region.

Further, in the first aspect, the rear region detection unit may detect a region generated by masking the region of the moving object before the change as the rear region, by setting the region of the moving object of which a position is changed in the moving direction within the target image as a mask region. This results in an effect of detecting the region generated by masking the region of the moving object as the rear region by setting the region of the moving object of which a position is changed in the moving direction as a mask region.

Further, in the first aspect, the rear region detection unit may include a moving speed detection unit that detects a moving speed of the moving object, and a mask processing unit that performs the masking by setting the region of the moving object of which the position is changed according to an amount of change depending on the moving speed as the mask region. This results in an effect of performing the masking by setting the region of the moving object of which the position is changed according to the amount of change depending on the moving speed as the mask region.

Further, in the first aspect, the rear region detection unit further may include an expansion unit that expands the region of the moving object in the target image in the moving direction, and the mask processing unit may perform the masking on the expanded region before the change by setting a region obtained by changing a position of an expanded region in the moving direction as the mask region, in which the expanded region is the region of the moving object expanded by the expansion unit. This results in an effect of detecting the region generated by masking the expanded region by setting the expanded region of which a position is changed in the moving direction as the mask region, as the rear region.

Further, in the first aspect, the predetermined image process may be a smoothing process along the moving direction. This results in an effect of performing the smoothing process along the moving direction.

Further, in the first aspect, the smoothing process may be performed to a degree depending on the moving speed along the moving direction on the rear region. This results in an effect of performing the smoothing process to a degree depending on the moving speed on the rear region.

Further, in the first aspect, the expansion unit may expand the region of the moving object in the moving direction depending on the moving speed. This results in an effect of expanding the region of the moving object depending on the moving speed.

Further, in the first aspect, the target image may be any one among the plurality of images, the rear region detection unit may detect a plurality of the rear regions in a rear portion of the moving object, and the smoothing processing unit may generate a plurality of images obtained by performing the smoothing process on a plurality of the rear regions. This results in an effect of detecting the plurality of rear regions and generating an image obtained by performing the smoothing process on the rear regions.

Further, in the first aspect, the rear region processing unit may perform the smoothing process, using a low pass filter having a pass band with a width corresponding to an amplitude of a periodic function representing a distribution of pixel values within the rear region in the direction along the moving direction. This results in an effect of performing the smoothing process, using the low pass filter having a pass band with a width corresponding to the amplitude of the periodic function.

Further, in the first aspect, an alignment processing unit that aligns a position of the target image to a position of the reference image such that the reference image that is the immediately preceding image with respect to the target image and the target image overlap in a common region may be further included, and the moving object detection unit may detect the moving object in the aligned target image. This results in an effect of detecting the moving object in the target image subjected to an alignment process.

Further, in the first aspect, the rear region processing unit may further perform the smoothing process on a region other than the moving object in the target image along the moving direction to a degree different from a degree of the rear region. This results in an effect of performing the smoothing process on the region other than the moving object to the degree different from the degree of the rear region.

Further, in the first aspect, an emphasis processing unit that emphasizes lines drawn along the moving direction among lines included in the rear region may be further included. This results in an effect of emphasizing the lines drawn along the moving direction.

Further, in the first aspect, the predetermined image process may be a process of coloring the rear region with a predetermined color. This results in an effect of coloring the rear region with the predetermined color.

Advantageous Effects of Invention

According to the present technology, it is possible to achieve an excellent effect that the image processing device can generate a dynamic image.

BRIEF DESCRIPTION OF DRAWINGS

FIG. 7 is a diagram illustrating an example of input image data in the first embodiment.

FIG. 9 is a diagram illustrating examples of movement region data in the first embodiment.

FIG. 14 is a diagram illustrating an example of output image data in the second modification example of the first embodiment.

FIG. 21 is a diagram illustrating an example of output image data in the second embodiment.

FIG. 26 is a diagram illustrating an example of input image data in the third embodiment.

FIG. 29 is a diagram illustrating an example of output image data in the third embodiment.

DESCRIPTION OF EMBODIMENTS

Below, modes for carrying out the present technology (hereinafter, referred to as "embodiment") will be described. In addition, a description will be made in the following order.
1. First embodiment (an image process: an example of performing a smoothing process on a rear region)
2. Second embodiment (an image process: an example of performing a smoothing process on a plurality of rear regions within one moving object)
3. Third embodiment (an image process: an example of performing a smoothing process on a rear region of an image after alignment)

1. First Embodiment

Configuration Example of Information Processing Apparatus

Figure 1:
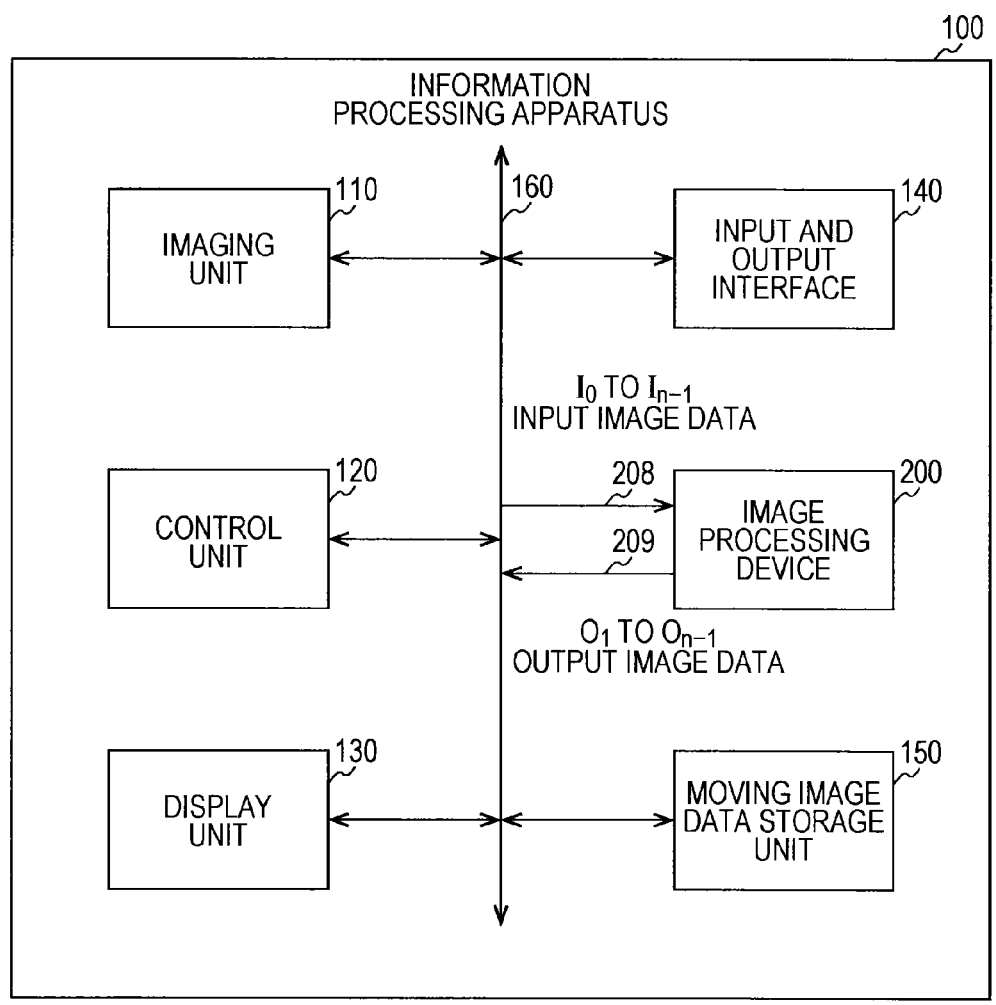
FIG. 1 is a block diagram illustrating a configuration example of an information processing apparatus in a first embodiment.

FIG. 1 is a block diagram illustrating a configuration example of an information processing apparatus 100 in a first embodiment. The information processing apparatus 100 is an apparatus which performs various information processes such as a capturing of an image of moving image data and an image process for the moving image data. The information processing apparatus 100 includes an imaging unit 110, a control unit 120, a display unit 130, an input and output interface 140, a moving image data storage unit 150, a bus 160, and an image processing device 200.

The imaging unit 110 captures an image of a subject such as a moving object so as to generate the moving image data. The moving image data includes a plurality of pieces of image data which are temporally consecutive. The imaging unit 110 outputs the generated moving image data to the moving image data storage unit 150.

The control unit 120 controls an entire information processing apparatus 100. The control unit 120 performs, for example, a control operation for causing the imaging unit 110 to generate the moving image data and a control operation for causing the image processing device 200 to perform an imaging process for the moving image data.

The display unit 130 displays the moving image data. The input and output interface 140 performs an output operation of data to an external device of the information processing apparatus 100 and an input operation of data from the external device. Data to be input or output includes the moving image data, and the like. The moving image data storage unit 150 stores the moving image data. The bus 160 is a common path through which the imaging unit 110, the control unit 120, the display unit 130, the input and output interface 140, the moving image data storage unit 150, and the image processing device 200 transmit or receive data.

The image processing device 200 performs a predetermined image process on image data within the moving image data. The image processing device 200 reads a plurality of pieces of image data as input image data through a signal line 208 from the moving image data storage unit 150. The image processing device 200 sets an image of at least one of the plurality of pieces of input image data as a target image, and detects a moving object in the target image. Then, the image processing device 200 detects a moving direction of the moving object. The image processing device 200 detects a region of a rear portion with respect to the moving direction in the moving object, as a rear region. The image processing device 200 performs a smoothing process on the detected rear region along the moving direction. The image processing device 200 outputs the image data obtained through the smoothing process as output image data to the display unit 130 and the like through the signal line 209.

Configuration Example of Image Processing Device

Figure 2:
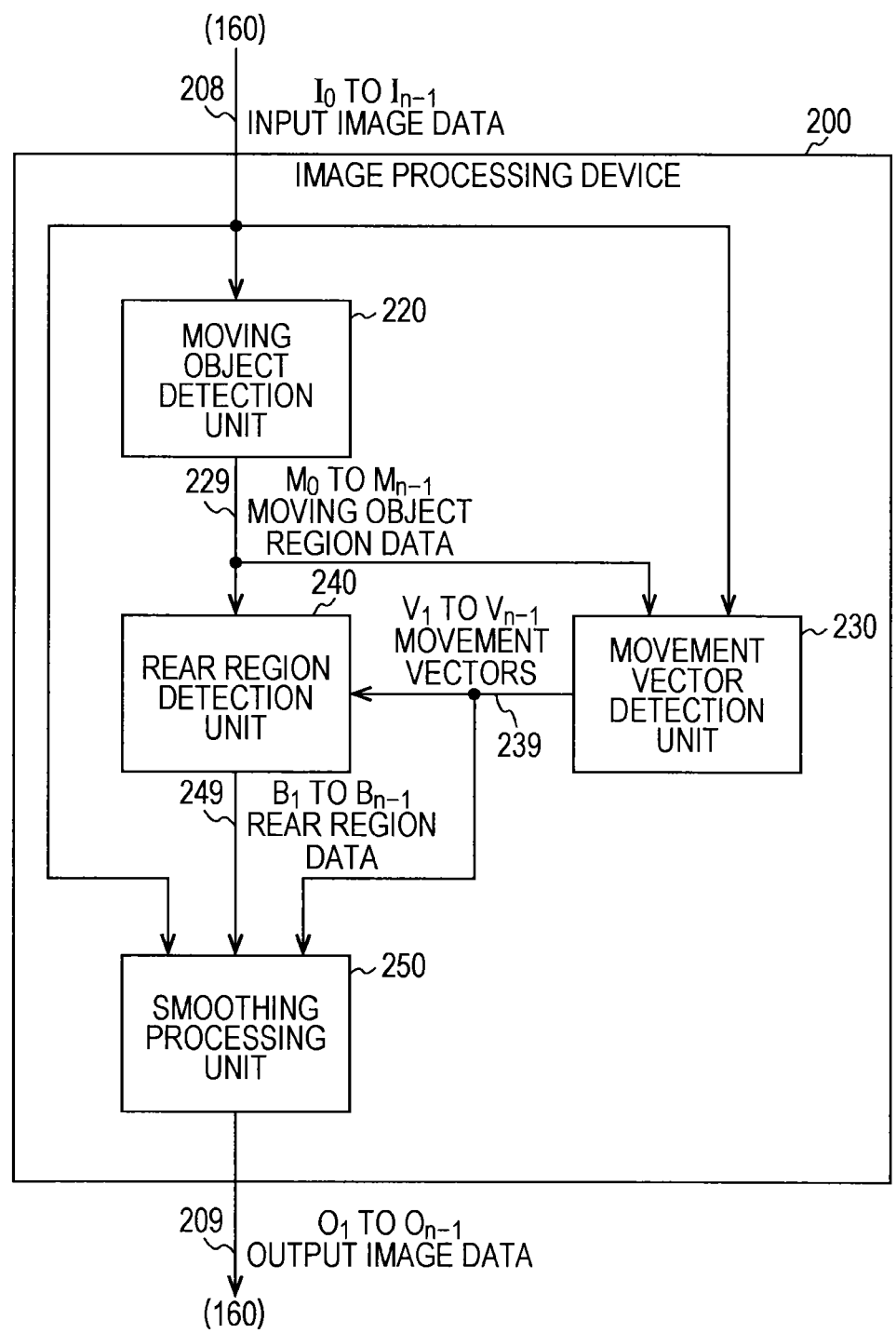
FIG. 2 is a block diagram illustrating a configuration example of an image processing device in the first embodiment.

FIG. 2 is a block diagram illustrating a configuration example of the image processing device 200 in the first embodiment. The image processing device 200 includes a moving object detection unit 220, a movement vector detection unit 230, a rear region detection unit 240, and a smoothing processing unit 250.

The moving object detection unit 220 detects a moving object in the input image data. The moving object detection unit 220 respectively detects a moving object, for example, in each of n (n is an integer of 2 or greater) pieces of input image data $I_0$ to $I_{n-1}$. The details of a detection method of the moving object will be described later. The moving object detection unit 220 supplies data indicating the region of the detected moving object as moving object region data $M_0$ to $M_{n-1}$ to the movement vector detection unit 230 and the rear region detection unit 240 through the signal line 229. The moving object region data is image data in which for example, the pixel values of pixels within the region of the moving object are set to "1" and the other pixel values are set to "0". In addition, the moving object detection unit 220 is an example of a moving object acquisition unit described in claims.

The movement vector detection unit 230 detects the moving direction of the moving object. For example, the movement vector detection unit 230 sets the immediately preceding image with respect to the target image as a reference image corresponding to the target image. Then, the movement vector detection unit 230 detects a vector of which a start point is specific coordinates (for example, coordinates of a centroid) within the moving object in the reference image and an end point is specific coordinates within the moving object in the target image, as a movement vector (in other words, a moving direction). However, since there is no reference image corresponding to chronologically first input image data among n pieces of input image data, the movement vector detection unit 230 detects a movement vector for each of the second and subsequent n−1 pieces of input image data. The movement vector detection unit 230 supplies the detected movement vectors $V_1$ to $V_{n-1}$ to the rear region detection unit 240 and the smoothing processing unit 250 through the signal line 239.

In addition, the movement vector detection unit 230 is an example of a moving direction acquisition unit described in claims. Further, the movement vector detection unit 230 obtains movement vectors for the second and subsequent input image data, but may obtain the movement vector for the first input image data. For example, the movement vector detection unit 230 may interpolate the same vector as the second movement vector $V_1$, as a movement vector $V_0$ for the first input image data.

The rear region detection unit 240 detects a region of a rear portion with respect to the movement vector in each piece of the input image data of which the movement vector is detected, as a rear region. The details of the detection method of the rear region will be described later. The rear region detection unit 240 supplies rear region data $B_1$ to $B_{n-1}$ indicating the detected rear region to the smoothing processing unit 250 through the signal line 249. The rear region data is image data in which for example, the pixel values of pixels within the rear region are set to "1" and the other pixel values are set to "0".

The smoothing processing unit 250 performs a smoothing process on the rear region along the moving direction. The smoothing processing unit 250 performs the smoothing process along the direction of the movement vector, in each rear region of the second and subsequent input image data for which the rear region is detected. The smoothing processing unit 250 performs the smoothing process, using, for example, a moving average filter. In the moving average filter, the pixel value obtained through the smoothing process is obtained from, for example, Expression 1 and Expression 2.

[Expression 1]

$$P_0' = \frac{1}{K} \sum_{k=0}^{k=K-1} P_k \quad \text{Expression 1}$$

[Expression 2]

$$K = |V| \times \alpha \quad \text{Expression 2}$$

In Expression 1, $P_0$ to $P_{K-1}$ are pixel values of pixels within the moving object region before the smoothing process is performed. Among the pixel values, $P_1$ to are pixel values of pixels arranged in the moving direction, as viewed from the pixel corresponding to $P_0$. For example, when $P_0$ is the pixel value of coordinates (0, 0) and the moving direction is an X-axis direction, the pixel values of coordinates (1, 0) to (K−1, 0) are input as $P_1$ to $P_{K-1}$ to the Expression 1. K is a degree of smoothing, specifically, is the filter order of the moving average filter. $P_0'$ is a pixel value obtained by performing the smoothing process on the pixel corresponding to $P_0$. In the Expression 2, |V| is the size of a movement vector between two frames (in other words, a moving speed of the moving object). α is a predetermined coefficient and is set as a real number. The smoothing processing unit 250 outputs the image data obtained through the smoothing process as output image data $O_1$ to $O_{n-1}$.

In addition, the smoothing processing unit 250 performs the smoothing process on the entirety of the second and subsequent input image data, but may perform the smoothing process only on some pieces of the input image data (for example, any one piece of the input image data). Further, the smoothing processing unit 250 performs the smoothing process using the moving average filter, but may perform the smoothing process using a filter (for example, a Gaussian filter) other than the moving average filter. Further, the smoothing processing unit 250 sets the degree (K) of smoothing as a value depending on the moving speed (|V|), but may perform the smoothing process by setting K as a certain value, irrespective of the moving speed. Further, the smoothing processing unit 250 is an example of a rear region processing unit in claims.

Figure 3:
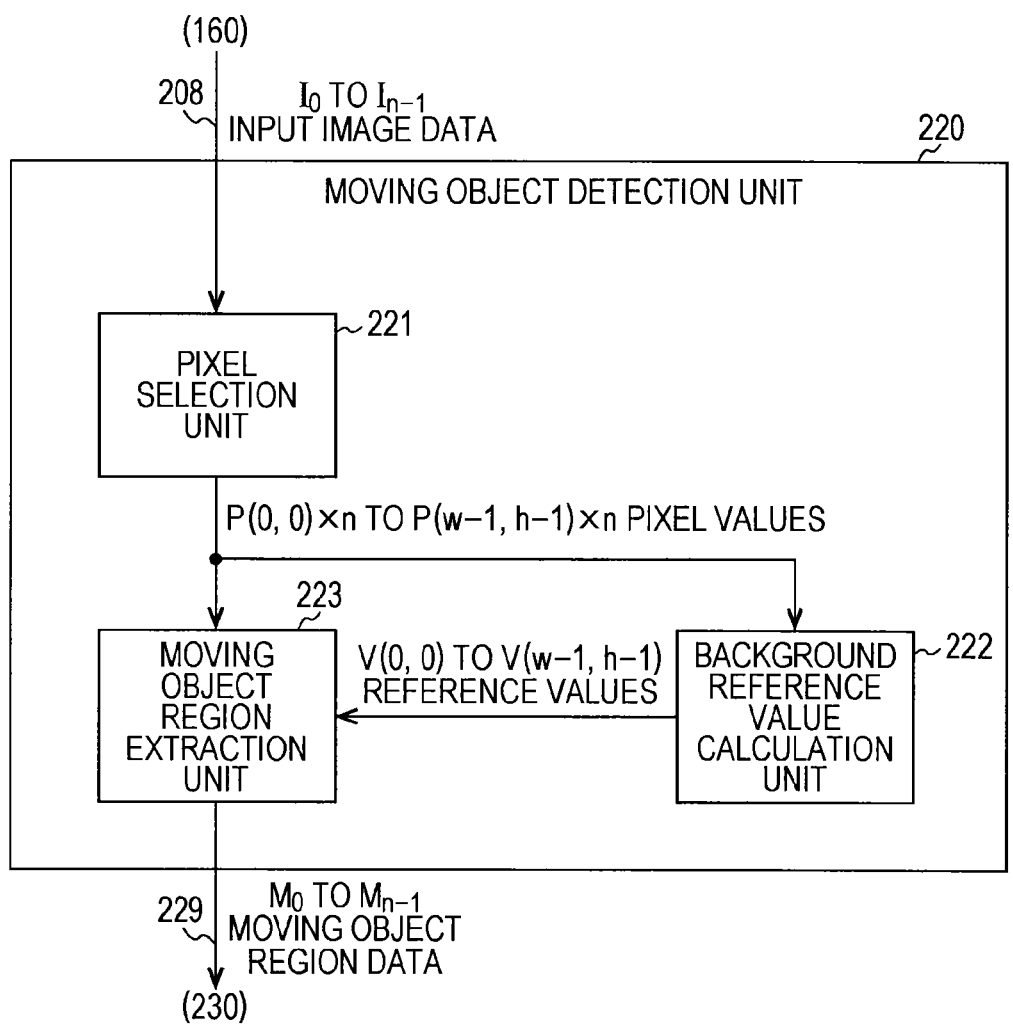
FIG. 3 is a block diagram illustrating a configuration example of a moving object detection unit in the first embodiment.

FIG. 3 is a block diagram illustrating a configuration example of the moving object detection unit 220 in the first embodiment. The moving object detection unit 220 includes a pixel selection unit 221, a background reference value calculation unit 222 and a moving object region extraction unit 223.

The pixel selection unit 221 selects n pixel values of the corresponding coordinates in n pieces of input image data $I_0$ to $I_{n-1}$. For example, when each piece of the input image data is configured with w×h (w and h are integers of one or greater) pixels having coordinates (0, 0) to (w−1, h−1), the pixel selection unit 221 selects respective pixel values of coordinates (0, 0) from n pieces of input image data. Thus, n pixel values are selected. Then, the pixel selection unit 221 selects the pixel value of coordinates (0, 1) for respective n pieces of input image data. Thus, n subsequent pixel values are selected. In this manner, finally, n pixel values of a w×h set are selected for the input image data $I_0$ to $I_{n-1}$. The selected pixel values are supplied to the background reference value calculation unit 222 and the moving object region extraction unit 223.

The background reference value calculation unit 222 calculates a reference value for determining whether a pixel of the input image data is a pixel of a background, for each of coordinates. The background reference value calculation unit 222 calculates, for example, the most frequent value as the reference value, in each of the w×h sets. This is because there is a possibility that the pixels of the pixel value, of which appearance frequency is high, in the n consecutive images are estimated as the background. The background reference value calculation unit 222 supplies the calculated reference values V(0, 0) to V(w−1, h−1) to the moving object region extraction unit 223. In addition, the background reference value calculation unit 222 may calculates the average values of the n pixel values as the reference value.

The moving object region extraction unit 223 extracts the region of the moving object in each of the input image data. The moving object region extraction unit 223 calculates a difference between the pixel value of a pixel and the reference value corresponding to the pixel, for each pixel in the input image data. When the calculated difference is equal to or less than a predetermined threshold, the moving object region extraction unit 223 determines that the pixel is a pixel of the background. In contrast, when the calculated difference is greater than the threshold, the moving object region extraction unit 223 determines that the pixel is a pixel of the moving object. The moving object region extraction unit 223 generates moving object region data $M_0$ to $M_{n-1}$ based on the determination results and outputs the generated data. In the moving object region data, for example, a pixel determined to be the moving object is set to the pixel value of "1", and a pixel determined to be the background is set to the pixel value of "0".

In addition, the moving object detection unit 220 detects the moving object based on the appearance frequency of the pixel value, but may detect the moving object using other methods. For example, the moving object detection unit 220 may use an inter-frame difference method of calculating the difference between pixel values of corresponding pixels in a plurality of consecutive images, and detecting a pixel of which the difference is equal to or greater than a threshold as a pixel of the moving object.

Figure 4:
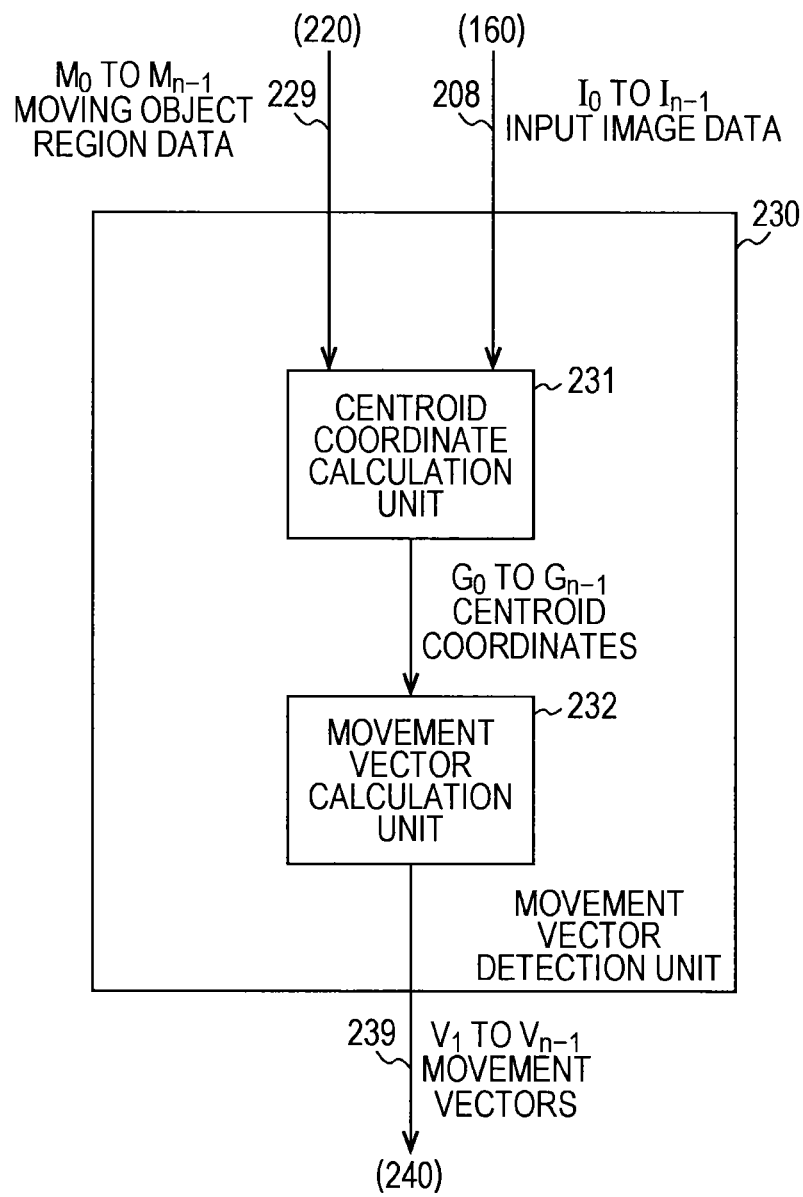
FIG. 4 is a block diagram illustrating a configuration example of a movement vector detection unit in the first embodiment.

FIG. 4 is a block diagram illustrating a configuration example of the movement vector detection unit 230 in the first embodiment. The movement vector detection unit 230 includes a centroid coordinates calculation unit 231 and a movement vector calculation unit 232.

The centroid coordinates calculation unit 231 calculates coordinates of the centroid in the region of the moving object. The centroid coordinates calculation unit 231 receives input image data and the moving object region data corresponding to the input image data. The centroid coordinates calculation unit 231 calculates the centroid in the moving object by setting a density using each pixel value of the moving object in the input image data. Specifically, the centroid coordinates calculation unit 231 calculates the coordinates of the centroid, using, for example, the following Expression 3 and Expression 4.

[Expression 3]

$$\begin{pmatrix} g_i \\ g_j \end{pmatrix} = \frac{1}{W_p} \sum_i \sum_j P[i][j] \begin{pmatrix} i \\ j \end{pmatrix} \qquad \text{Expression 3}$$

[Expression 4]

$$W_p = \sum_i \sum_j P[i][j] \qquad \text{Expression 4}$$

In Expression 3, $g_i$ is an x coordinate of the centroid, and $g_j$ is a y coordinate of the centroid. Further, in Expression 3 and Expression 4, i is an x coordinate of the pixel within the region of the moving object, and j is a y coordinate of the pixel within the region of the moving object. P[i][j] is the pixel value of coordinates (i, j). The centroid coordinates calculation unit 231 calculates coordinates of the centroids $G_0$ to $G_{n-1}$ for n pieces of input data and supplies the calculated coordinates to the movement vector calculation unit 232.

In addition, the centroid coordinates calculation unit 231 may obtain the coordinates of the centroids by setting all pixel values within the region of the moving object in the input image data as a certain value (for example, "1"). In this case, the centroid coordinates calculation unit 231 calculates the coordinates of the centroids from only the moving object region data, by setting all P[i][j] in Expression 3 and Expression 4 as a certain value (for example, "1").

The movement vector calculation unit 232 calculates the movement vector from the coordinates of the centroid. The movement vector calculation unit 232 calculates a vector, in which the coordinates of the centroid of the moving object within the immediately preceding image (reference image) of the target image is set as the start point and the coordinates of the centroid of the moving object within the target image is set as the end point, as the movement vector. For example, a vector, in which the coordinates of the centroid $G_0$ is set as the start point and the coordinates of the centroid $G_1$ is set as the end point, is calculated as the movement vector $V_1$ of the moving object in the second input image data $I_1$.

In addition, the movement vector detection unit 230 may set coordinates other than the centroid as the start point or the end point of the moving vector. For example, the movement vector detection unit 230 may obtain the average value of x coordinates and the average value of y coordinates, in the respective moving objects, and may set the coordinates of the average values as the start point or the end point of the vector. Further, the movement vector detection unit 230 may calculate a movement vector for each piece of input image data (frame), but may obtain the average of the movement vectors within a certain period (for example, 30 frames) and output the average vector as the movement vector within the period.

Figure 5:
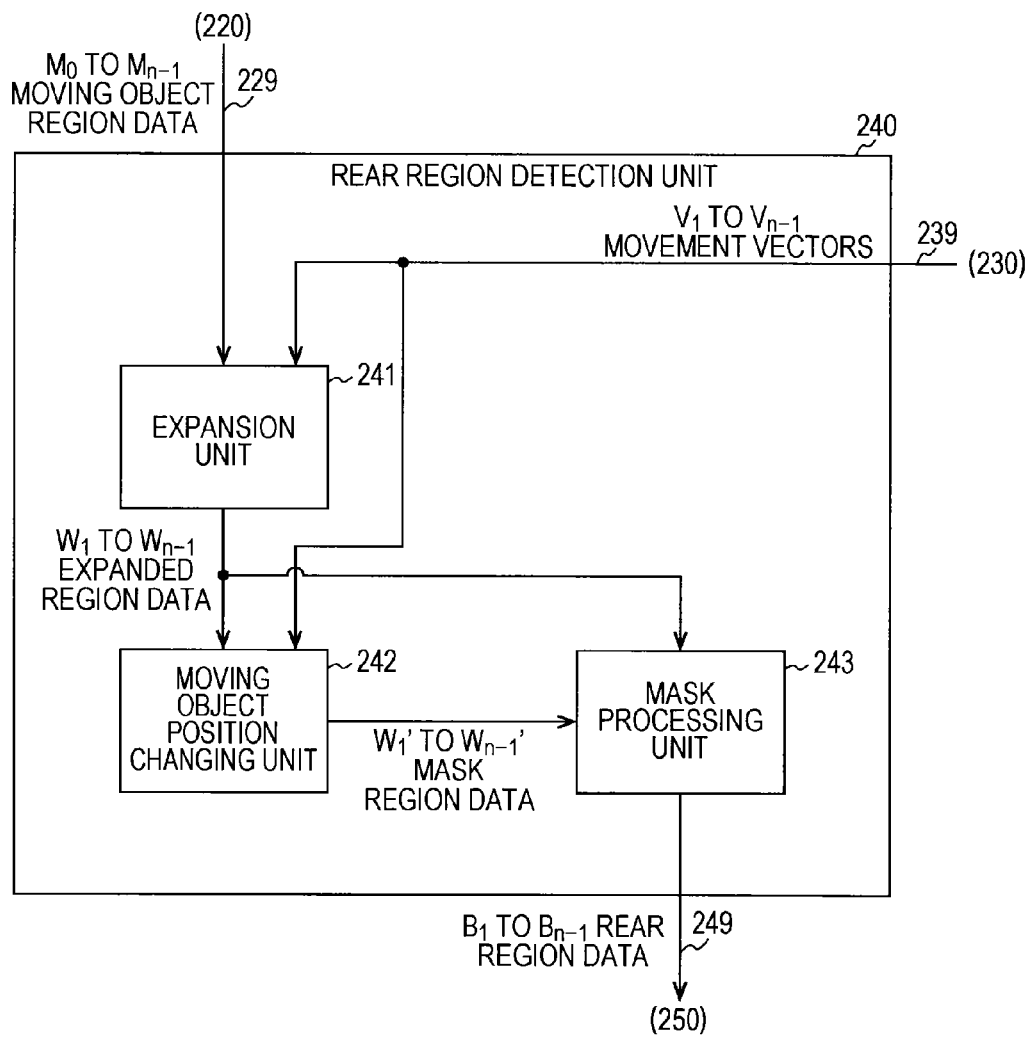
FIG. 5 is a block diagram illustrating a configuration example of a rear region detection unit in the first embodiment.

FIG. 5 is a block diagram illustrating a configuration example of the rear region detection unit 240 in the first embodiment. The rear region detection unit 240 includes an expansion unit 241, a moving object position changing unit 242 and a mask processing unit 243.

The expansion unit 241 expands the region of the moving object in the moving direction. The expansion unit 241 receives the moving object region data M and the movement vector V from the moving object detection unit 220 and the movement vector detection unit 230. The expansion unit 241 calculates the size |V| of the movement vector V. Then, the expansion unit 241 expands the moving object region M corresponding to the movement vector V in the direction of the movement vector by |V|×β (β is a real number). Thus, the moving direction of the moving object is set as a lateral direction, and the lateral width of the region of the moving object is expanded by |V|×β. The expansion unit 241 outputs the region M of the expanded moving object as expanded region data W, to the moving object position changing unit 242 and the mask processing unit 243.

The moving object position changing unit 242 changes the position of the region (W) of the expanded moving object in the moving direction. The moving object position changing unit 242 receives the expanded region data W and the movement vector V, from the expansion unit 241 and the movement vector detection unit 230. Then, the moving object position changing unit 242 changes (shifts) the position of the expanded region in the direction of the movement vector, by the distance of |V|×γ (γ is a real number). The moving object position changing unit 242 supplies the data on the expanded region, of which the position is changed, as the mask region data W' to the mask processing unit 243.

In addition, the expansion unit 241 expands the size of the region of the moving object depending on the moving speed (|V|) of the moving object, but may be configured to expand the region to a certain size, irrespective of the moving speed.

Further, the moving object position changing unit 242 changes the position by the distance depending on the moving speed (|V|), but may be configured to change the region to a certain distance, irrespective of the moving speed.

The mask processing unit 243 performs a masking process on the expanded region data W using mask region data W'. Through the masking process, some parts of the expanded region data W overlapping the mask region data W' are removed, and remaining regions are extracted. The mask processing unit 243 sets the regions generated through the masking process (in other words, the regions other than mask region data W') as the rear region, and outputs rear region data B indicating the rear region.

Operation Example of Image Processing Device

Figure 6:
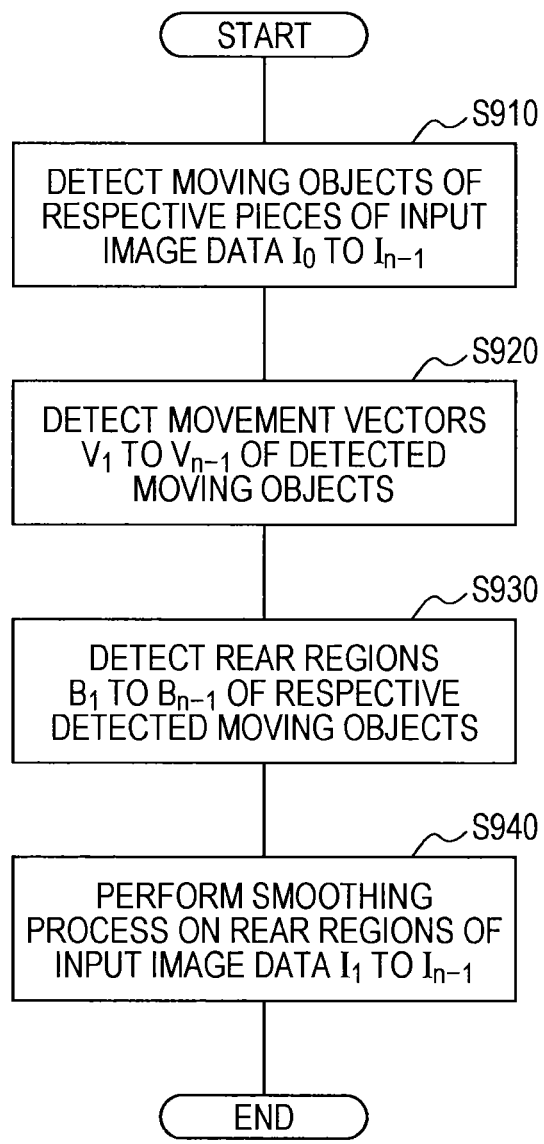
FIG. 6 is a flowchart illustrating an example of an operation of the image processing device in the first embodiment.

FIG. 6 is a flowchart illustrating an example of the operation of the image processing device 200 in the first embodiment. The operation is started when, for example, the input image data $I_0$ to $I_{n-1}$ is input to the image processing device 200. The image processing device 200 detects moving objects in the input image data $I_0$ to $I_{n-1}$, and generates moving object region data $M_0$ to $M_{n-1}$ (step S910). The image processing device 200 detects the movement vectors $V_1$ to $V_{n-1}$ of the moving object from the input image data $I_0$ to and the moving object region data $M_0$ to $M_{n-1}$ (step S920).

The image processing device 200 detects the rear region in each of the moving objects from the movement vectors $V_1$ to $V_{n-1}$ and the moving object region data $M_0$ to $M_{n-1}$, and generates the rear region data $B_1$ to $B_{n-1}$ (step S930). Then, the image processing device 200 performs the smoothing process on the rear region in the input image data, from the input image data $I_0$ to $I_{n-1}$ the rear region data $B_1$ to $B_{n-1}$ and the movement vectors $V_1$ to $V_{n-1}$ in the moving direction (step S940).

FIG. 7 is a diagram illustrating an example of the input image data in the first embodiment. a of FIG. 7 is the chronologically first input image data $I_0$, and b to d of FIG. 7 are the second to fourth input image data $I_1$ to $I_3$. In a to d of FIG.

7, the image of a vehicle is captured, and the position of the vehicle changes in a horizontal direction with the passage of time.

Figure 8:
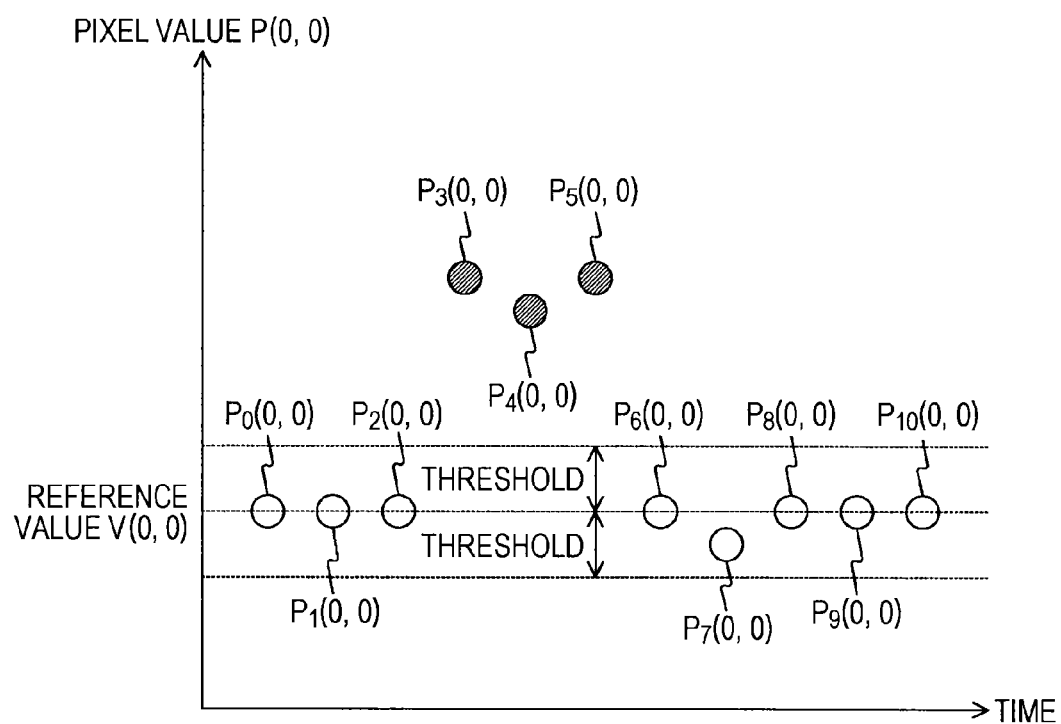
FIG. 8 is a diagram illustrating a distribution example of pixel values in the first embodiment.

FIG. 8 is a diagram illustrating a distribution example of pixel values in the first embodiment. In FIG. 8, a vertical axis represents pixel values, and a horizontal axis represents time. Further, $P_0(0, 0)$ to $P_{10}(0, 0)$ are pixel values of coordinates (0, 0) of respective pieces of input image data $I_0$ to $I_{10}$. In FIG. 8, the appearance frequencies of the pixel values of $P_0(0, 0)$ to $P_2(0, 0)$ are high, and the pixel values are used as the reference value $V(0, 0)$. Since $P_0(0, 0)$ to $P_2(0, 0)$ and $P_6(0, 0)$ to $P_{10}(0, 0)$ have differences from the reference value, which are equal to or less than a threshold, the pixels corresponding to $P_0(0, 0)$ to $P_2(0, 0)$ and $P_6(0, 0)$ to $P_{10}(0, 0)$ are determined to be pixels of the background. In contrast, since the pixel values of $P_3(0, 0)$ to $P_5(0, 0)$ have differences from the reference value, which are equal to or greater than the threshold, the pixels corresponding to $P_3(0, 0)$ to $P_5(0, 0)$ are determined to be pixels of the moving object. In the same manner, with respect to coordinates other than (0, 0), whether or not they are of moving objects is determined based on the appearance frequencies.

FIG. 9 illustrates examples of movement region data in the first embodiment. a to d of FIG. 9 are moving object region data $M_0$ to $M_3$ which are generated from the input image data $I_0$ to $I_3$ illustrated in a to d of FIG. 7. In a to d of FIG. 7, white-painted regions are the regions of the background, and black-painted regions are the regions of the moving object. As illustrated in a to d of FIG. 7, a region of a vehicle is detected as the region of the moving object.

Figure 10:
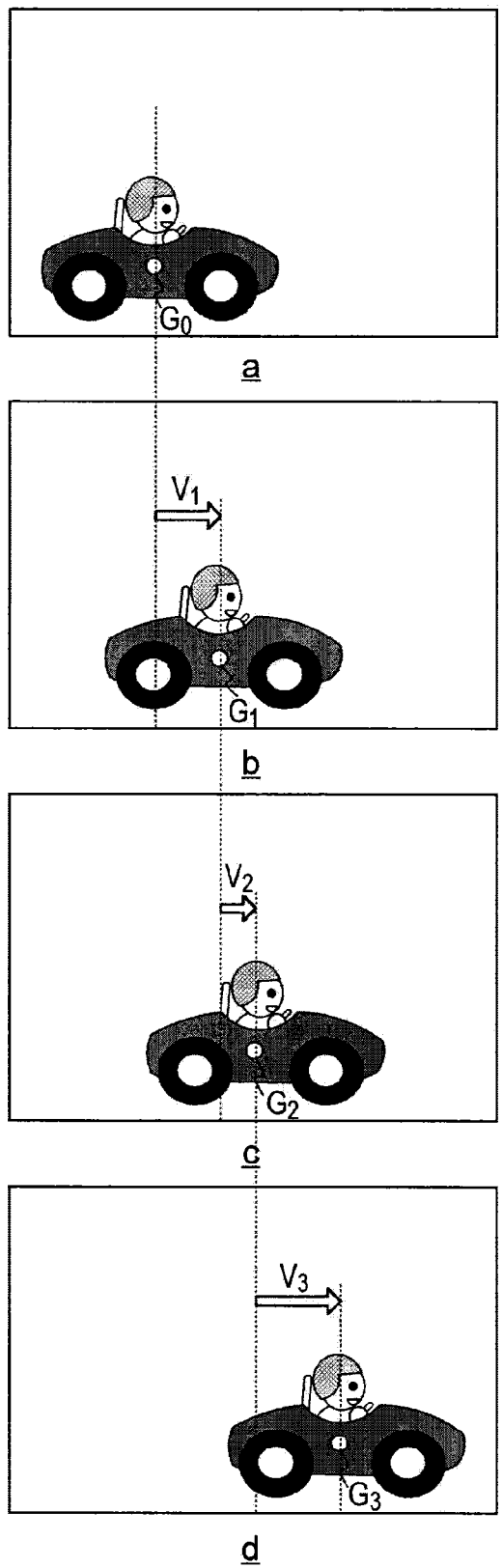
FIG. 10 is a diagram illustrating examples of a centroid and a movement vector in the first embodiment.

FIG. 10 is a diagram illustrating examples of a centroid and a movement vector in the first embodiment. a to d of FIG. 10 are diagrams illustrating centroids and movement vectors which are detected in the input image data $I_0$ to $I_3$ illustrated in a to d of FIG. 7. The background is omitted in a to d of FIG. 10. As illustrated in a to d of FIG. 10, the coordinates of the centroid $G_0$ to $G_3$ are calculated from Expression 3 and Expression 4 in the respective moving objects (vehicles). Then, in b of FIG. 10, a movement vector $V_1$ of which the start point is $G_0$ and the end point is $G_1$ is detected. Further, also in c and d of FIG. 10, the movement vectors $V_2$ and $V_3$ are detected from the coordinates of the centroids $G_1$ to $G_3$.

Figure 11:
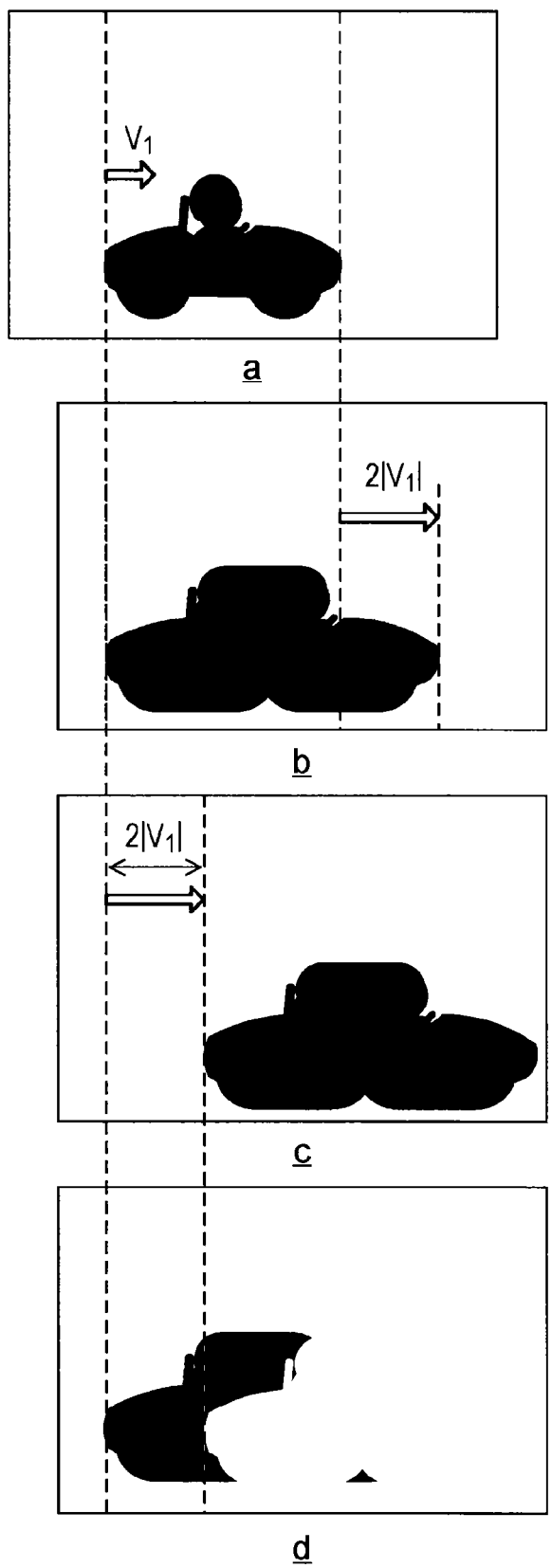
FIG. 11 is a diagram illustrating examples of moving object region data, expanded region data, mask region data, and rear region data in the first embodiment.

FIG. 11 is a diagram illustrating examples of moving object region data, expanded region data, mask region data, and rear region data in the first embodiment. a of FIG. 11 is a diagram illustrating the moving object region data $M_1$ corresponding to the second input image data $I_1$.

b of FIG. 11 illustrates expanded region data $W_1$ obtained by expanding the region (the black-painted region) of the moving object in the moving direction, in the moving object region data $M_1$ in a of FIG. 11. The rear region detection unit 240 expands the region of the moving object by $|V1| \times \beta$ ($\beta$ is, for example, "2") in the moving direction (V1). Thus, as illustrated in b of FIG. 11, the lateral width of the region of the moving object is expanded.

c of FIG. 11 illustrates mask region data $W1'$ obtained by changing the position of the expanded region in b of FIG. 11 in the moving direction. The rear region detection unit 240 changes the position of the expanded region by $|V1| \times \gamma$ ($\gamma$ is, for example, "2") in the moving direction. Thus, as illustrated in c of FIG. 11, the expanded region is shifted in the moving direction.

d of FIG. 11 illustrates rear region data $B_1$ generated by masking the expanded region data $W_1$ in b of FIG. 11 with the mask region data $W_1'$. As illustrated in c of FIG. 11, the rear region detection unit 240 removes the overlapping region between b of FIG. 11 and c of FIG. 11, in b of FIG. 11 and detects the remaining region as the rear region.

Here, when the region obtained by shifting the region of the moving object without being expanded is set as the mask region, a region of a part (such as a front wheel of the vehicle) other than the rear portion of the moving object may be left after the masking process. As illustrated in b of FIG. 11, detecting the region such as the front wheel of the vehicle as the rear region is prevented by changing the position after expanding the region of the moving object.

In addition, when the moving object has a shape with few irregularities such as a shape similar to an oval or a square, even if the region of the moving object is shifted without being expanded (in other words, with respect to $\beta$ described above, $\beta=0$), it is difficult for a region other than the rear portion to be detected as the rear region. Therefore, the rear region detection unit 240 may be configured to shift the region of the moving object without being expanded.

Further, the rear region detection unit 240 can detect the rear region through processes other than the masking process, if a region surrounded by the outline of the rear portion of which the position is changed in the moving direction and the outline before the change can be detected. Specifically, the rear region detection unit 240 divides the region of the moving object into two portions along the line perpendicular to the moving direction, and the outline of the rear portion with respect to the moving direction, among the two divided portions, is detected. Then, the rear region detection unit 240 may change the position of the outline in the moving direction, and detect the region surrounded by the outline before and after the change of the position, as the rear region.

Further, the rear region detection unit 240 may divide the region of the moving object into two portions along the line perpendicular to the moving direction, and detect the region of the rear portion, as it is, with respect to the moving direction, among the two divided portions, as the rear region.

Figure 12:
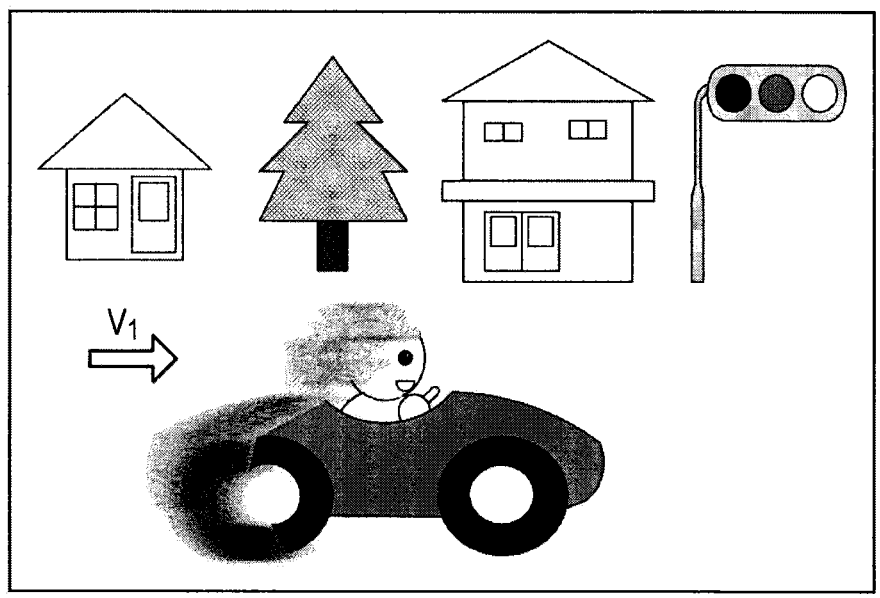
FIG. 12 is a diagram illustrating an example of output image data in the first embodiment.

FIG. 12 is a diagram illustrating an example of output image data in the first embodiment. FIG. 12 is output image data $O_1$ generated by performing the smoothing process on the region of the rear portion of the vehicle in the input image data $I_1$ illustrated in b of FIG. 7, along the moving direction. Thus, an image is generated in which the rear portion of the moving object is blurred in the moving direction, and the sensation of speed of the moving object is emphasized.

In this manner, according to the first embodiment of the present technology, the image processing device 200 can generate an image in which the rear region is smoothed along the moving direction, by performing the smoothing process on the rear region of the moving object along the moving direction. Thus, a dynamic image is obtained in which the sensation of speed of the moving object is emphasized.

First Modification Example

In the first embodiment, the image processing device 200 sets the pixels of the image values having high appearance frequency as the background and sets the pixels other than the background as the moving object, with respect to the respective pixels, and obtains a movement vector from the temporal change in the centroid of the moving object. However, the image processing device 200 may obtain the movement vector through a block matching. The first modification example is different from the first embodiment in that an image processing device 200 of the first modification example obtains the movement vector through the block matching.

Specifically, the moving object detection unit 220 of first modification example divides the input image data into a plurality of blocks of a predetermined shape, and obtains blocks having a highest correlation between blocks within one search range and blocks within another search range, among the search ranges which are adjacent to each other of the input image data. Here, the search range is a range for searching for a motion vector. Further, the height of the correlation is obtained through a Sum of Absolute Differences estimation (SAD) process of calculating the sum of absolute difference values of pixel values. In addition, the height of the correlation may be obtained through a Maximum matching Pixel Count (MPC) process of counting the number of pixels of which the absolute difference values of pixel values are equal to or less than a predetermined difference threshold.

The moving object detection unit 220 detects a vector directed from one to the other of two blocks having the highest correlation within a search range, as a motion vector. Then, the moving object detection unit 220 detects a region configured with blocks, of which the movement amounts represented by the motion vectors exceed a predetermined threshold, as the region of the moving object.

In addition, the moving object detection unit 220 may supply the obtained motion vectors as the movement vectors, as they are, to the rear region detection unit 240 and the smoothing processing unit 250.

Second Modification Example

Although the image processing device 200 in the first embodiment smooths the rear region in the moving direction, the image processing device 200 may perform a process of emphasizing a line along the moving direction. The second modification example is different from the first embodiment in that an image processing device 200 of the second modification example emphasizes the line along the moving direction in the rear region.

Figure 13:
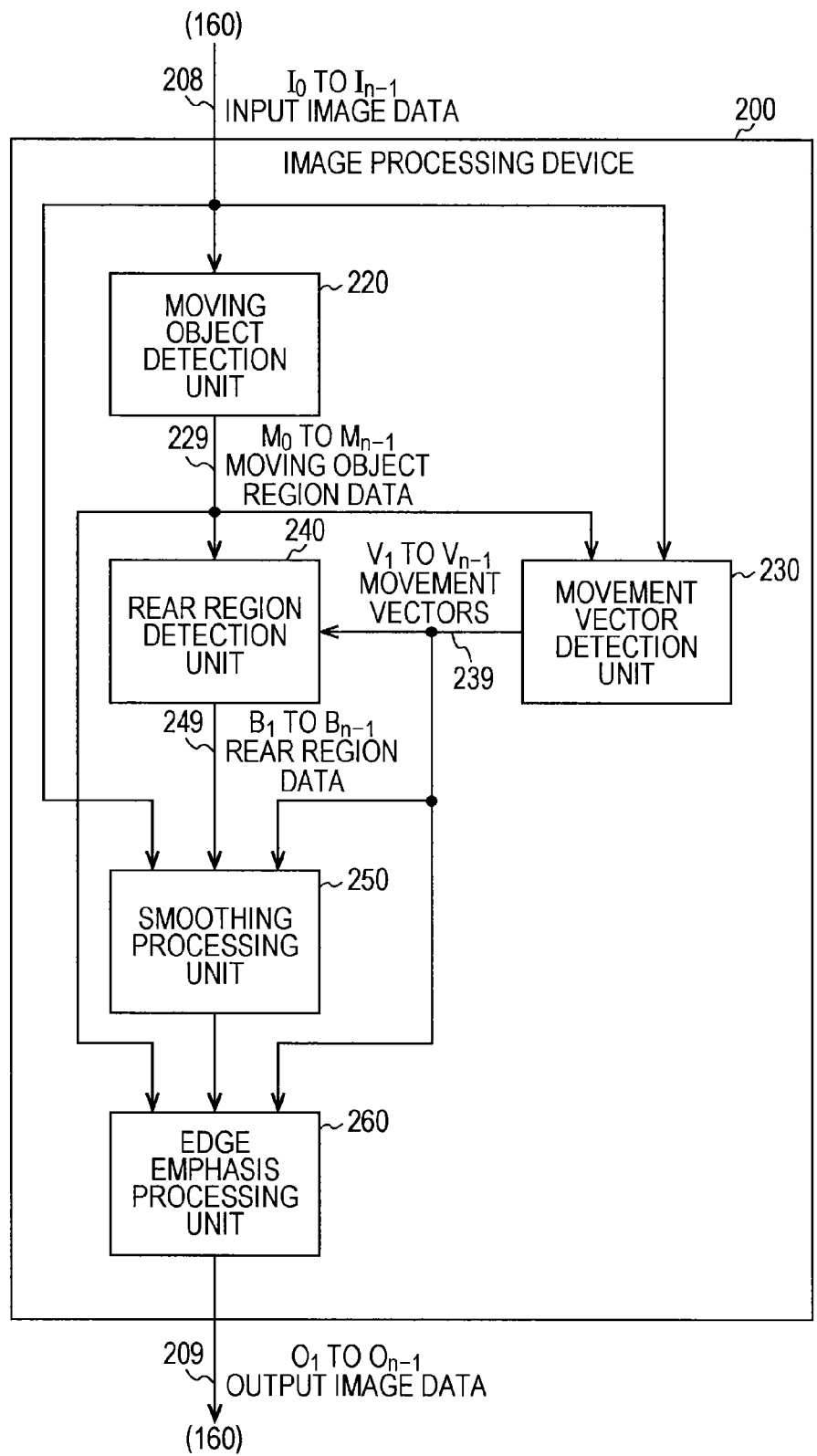
FIG. 13 is a block diagram illustrating a configuration example of an image processing device in a second modification example of the first embodiment.

FIG. 13 is a block diagram illustrating a configuration example of the image processing device 200 in the second modification example of the first embodiment. The second modification example is different from the first embodiment in that the image processing device 200 of the second modification example further includes an edge emphasis processing unit 260.

The edge emphasis processing unit 260 emphasizes lines along the moving direction in the rear region. The image data subjected to the smoothing process by the smoothing processing unit 250, the moving object region data, and the movement vector are input to the edge emphasis processing unit 260. The edge emphasis processing unit 260 performs a process of emphasizing an edge in a direction perpendicular to the movement vector, using a high pass filter or the like, in the rear region within the image data. The line along the moving direction is relatively emphasized by emphasizing the edge located at 90 degrees with respect to the moving direction. The edge emphasis processing unit 260 outputs the image data of which the edge is emphasized as the output image data. In addition, the edge emphasis processing unit 260 is an example of an emphasis processing unit described in claims.

FIG. 14 is a diagram illustrating an example of output image data in the second modification example. a of FIG. 14 is a diagram illustrating a portion of the moving object in the input image data before the smoothing process is performed. As illustrated in a of FIG. 14, the moving object having a checkered pattern of black and white is detected. In FIG. 14, a region surrounded by a dotted line is the rear region of the moving object.

b of FIG. 14 is a diagram illustrating a portion of the moving object in the input image data after the smoothing process is performed. As illustrated in b of FIG. 14, the rear region is smoothed. c of FIG. 14 is a diagram illustrating a portion of the moving object in the input image data after the edge emphasis is performed. As illustrated in c of FIG. 14, the edge is emphasized in a direction perpendicular to the movement vector, in the rear region. As a result, a line extending in a horizontal direction with respect to the movement vector is emphasized. Therefore, the moving object may be seen as being relatively further smoothed, with respect to the moving direction.

Third Modification Example

Although the image processing device 200 in the first embodiment detects the moving object and the movement vector, the image processing device 200 does not need to detect the moving object and the movement vector. The fourth modification example is different from the first embodiment in that an image processing device 200 itself of the fourth modification example does not detect the moving object and the movement vector.

Figure 15:
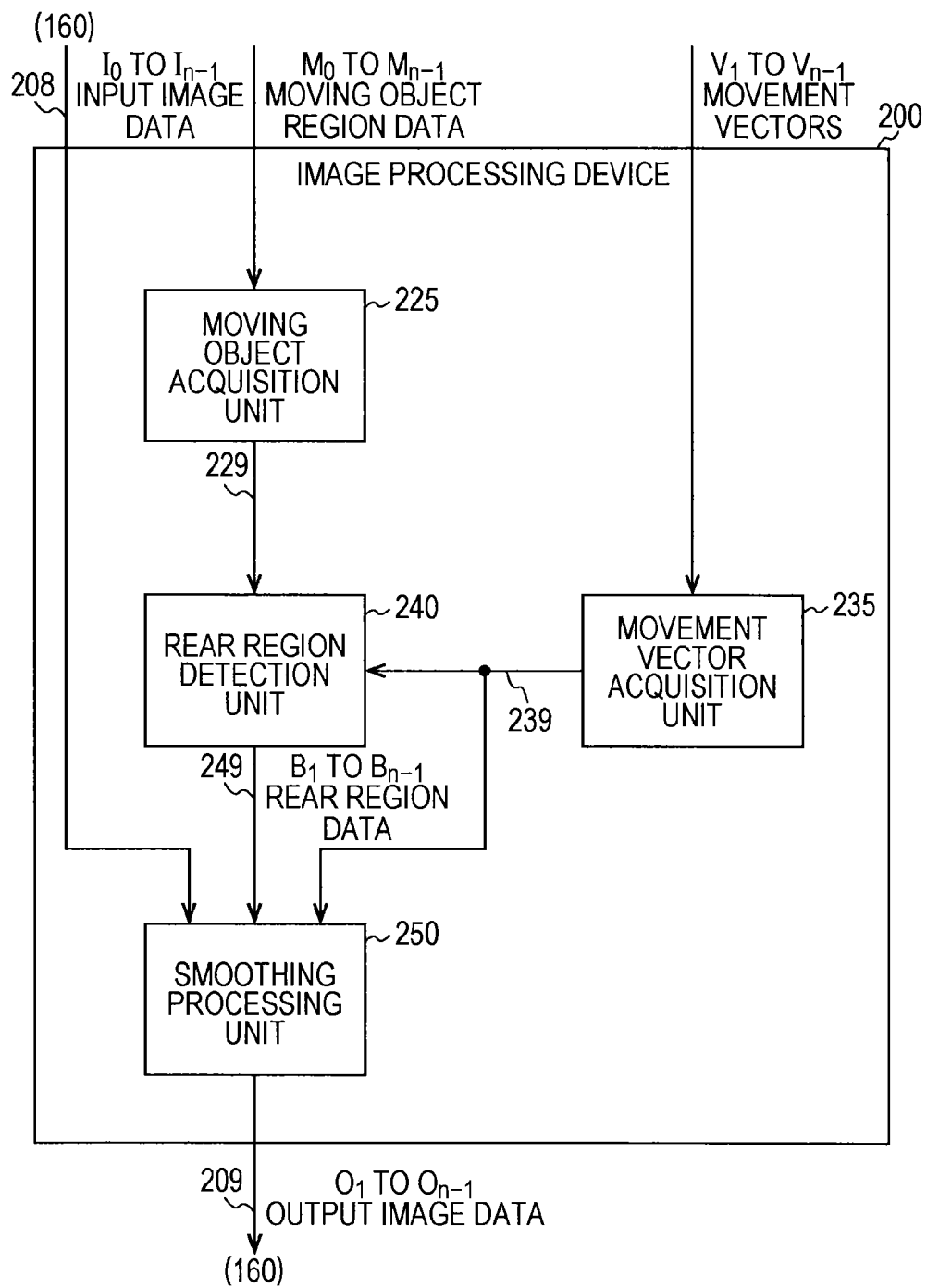
FIG. 15 is a block diagram illustrating a configuration example of an image processing device 200 in a third modification example of the first embodiment.

FIG. 15 is a block diagram illustrating a configuration example of the image processing device 200 in the third modification example of the first embodiment. The third modification example is different from the first embodiment in that the image processing device 200 of the third modification example includes a moving object acquisition unit 225 and a movement vector acquisition unit 235, instead of the moving object detection unit 220 and the movement vector detection unit 230.

In addition to the input image data, the moving object region data and the movement vector are input to the image processing device 200 of the third modification example. For example, the user manually obtains the region and movement vector of the moving object, and inputs the obtained region and movement vector to the information processing apparatus 100. The moving object acquisition unit 225 acquires the region of the input moving object and supplies the acquired region to the rear region detection unit 240. The movement vector acquisition unit 235 acquires the input movement vector and supplies the acquired input movement vector to the rear region detection unit 240 and the smoothing processing unit 250. In addition, a configuration is possible in which the user inputs only one of the moving object and the movement vector and the image processing device 200 detects the other one.

Fourth Modification Example

Although the image processing device 200 in the first embodiment performs the smoothing process on the rear region, the image processing device 200 may perform an image process other than the smoothing process. For example, the rear region may be subjected to a coloring process with a predetermined color. The fourth modification example is different from the first embodiment in that an image processing device 200 of the fourth modification example fills the rear region with a predetermined color.

Figure 16:
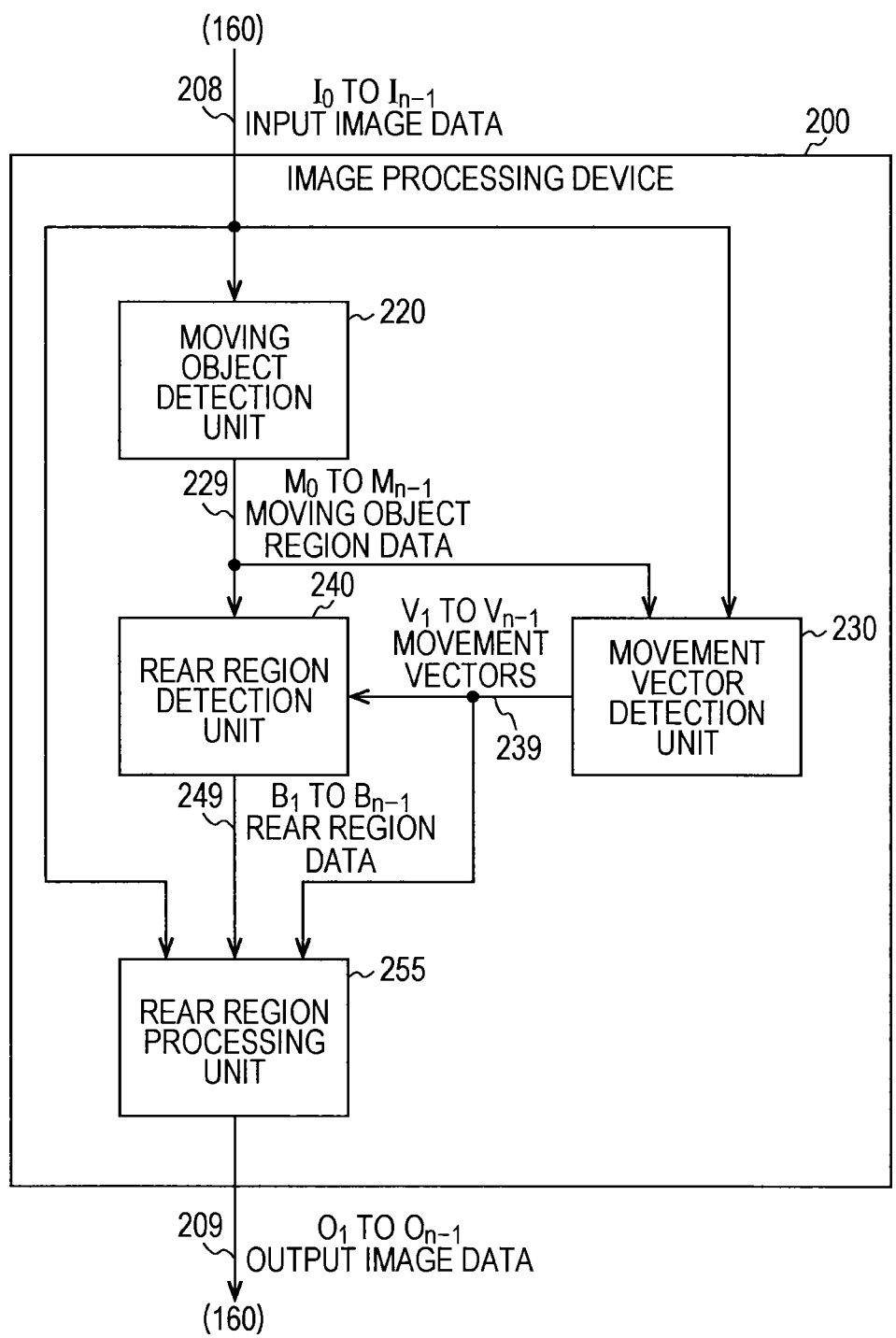
FIG. 16 is a block diagram illustrating a configuration example of an image processing device 200 in a fourth modification example of the first embodiment.

FIG. 16 is a block diagram illustrating a configuration example of the image processing device 200 in the fourth modification example of the first embodiment. The fourth modification example is different from the first embodiment in that the image processing device 200 of the fourth modification example includes a rear region processing unit 255 instead of the smoothing processing unit 250. The rear region processing unit 255 obtains a pixel value P0' after the smoothing process is performed, by the following Expression 6 or Expression 7 instead of Expressions 1 and 2.

$$P0'=0 \qquad \text{Expression 6}$$

$$P0'=255 \qquad \text{Expression 7}$$

0 in Expression 6 is a value indicating a minimum value of the pixel value represented by eight bits, and 255 in Expression 7 is a value indicating a maximum value of the pixel value.

2. Second Embodiment

Configuration Example of Image Processing Device

Figure 17:
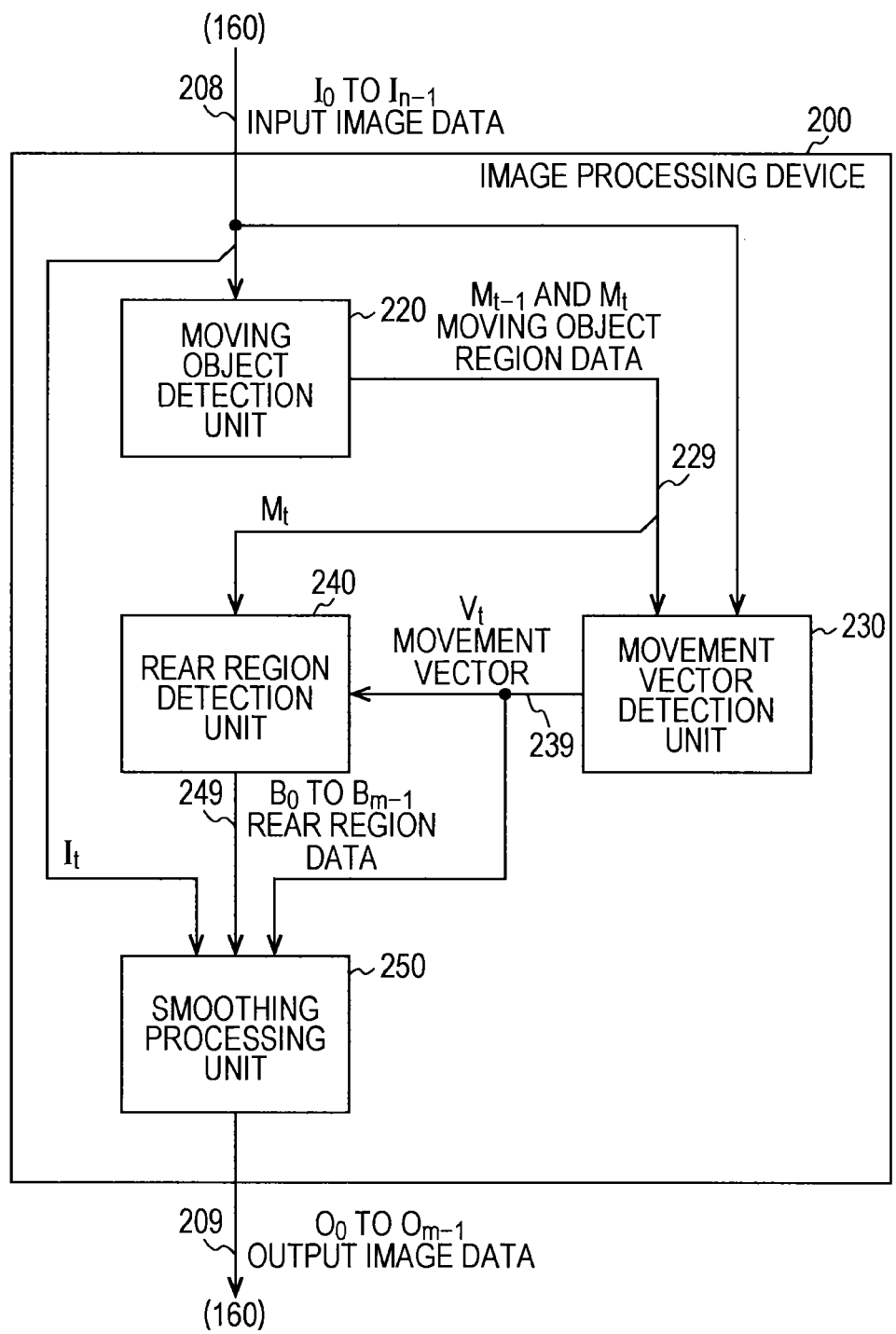
FIG. 17 is a block diagram illustrating a configuration example of an image processing device in a second embodiment.

FIG. 17 is a block diagram illustrating a configuration example of an image processing device 200 in the second embodiment. The second embodiment is different from the first embodiment in that the image processing device 200 of the second embodiment detects a plurality of different rear regions in one piece of input image data and smooths the respective rear regions.

The second embodiment is different from the first embodiment in that the moving object detection unit 220 of the second embodiment generates only moving object region data $M_t$ and $M_{t-1}$, instead of all pieces of data, among the moving object region data $M_0$ to $M_{n-1}$. The moving object detection unit 220 outputs the moving object region data $M_t$ and $M_{t-1}$ to the movement vector detection unit 230, and outputs the moving object region data $M_t$ to the rear region detection unit 240.

The movement vector detection unit 230 is different from that of the first embodiment in that the movement vector detection unit 230 detects only one movement vector Vt instead of the movement vectors $M_1$ to $M_{n-1}$.

The rear region detection unit 240 is different from that of the first embodiment in that a plurality of rear regions in the moving object are detected from the moving object region data $M_t$ and movement vector $V_t$. The rear region detection unit 240 generates rear region data $B_0$ to $B_{m-1}$ (m is an integer of two or more) indicating the rear region and outputs the generated rear region data to the smoothing processing unit 250.

The smoothing processing unit 250 is different from that of the first embodiment in that the smoothing process is performed on a plurality of rear regions in the input image data $I_t$, from the input image data $I_t$, the rear region data $B_0$ to $B_{m-1}$, and the movement vector $V_t$. The smoothing processing unit 250 outputs output image data $O_0$ to $O_{m-1}$ which is the execution result of the smoothing process. Here, the same value is set to the value of a degree of smoothing K, in the smoothing process for m rear regions. In addition, the smoothing processing unit 250 may perform a different degree of smoothing on respective rear regions.

Figure 18:
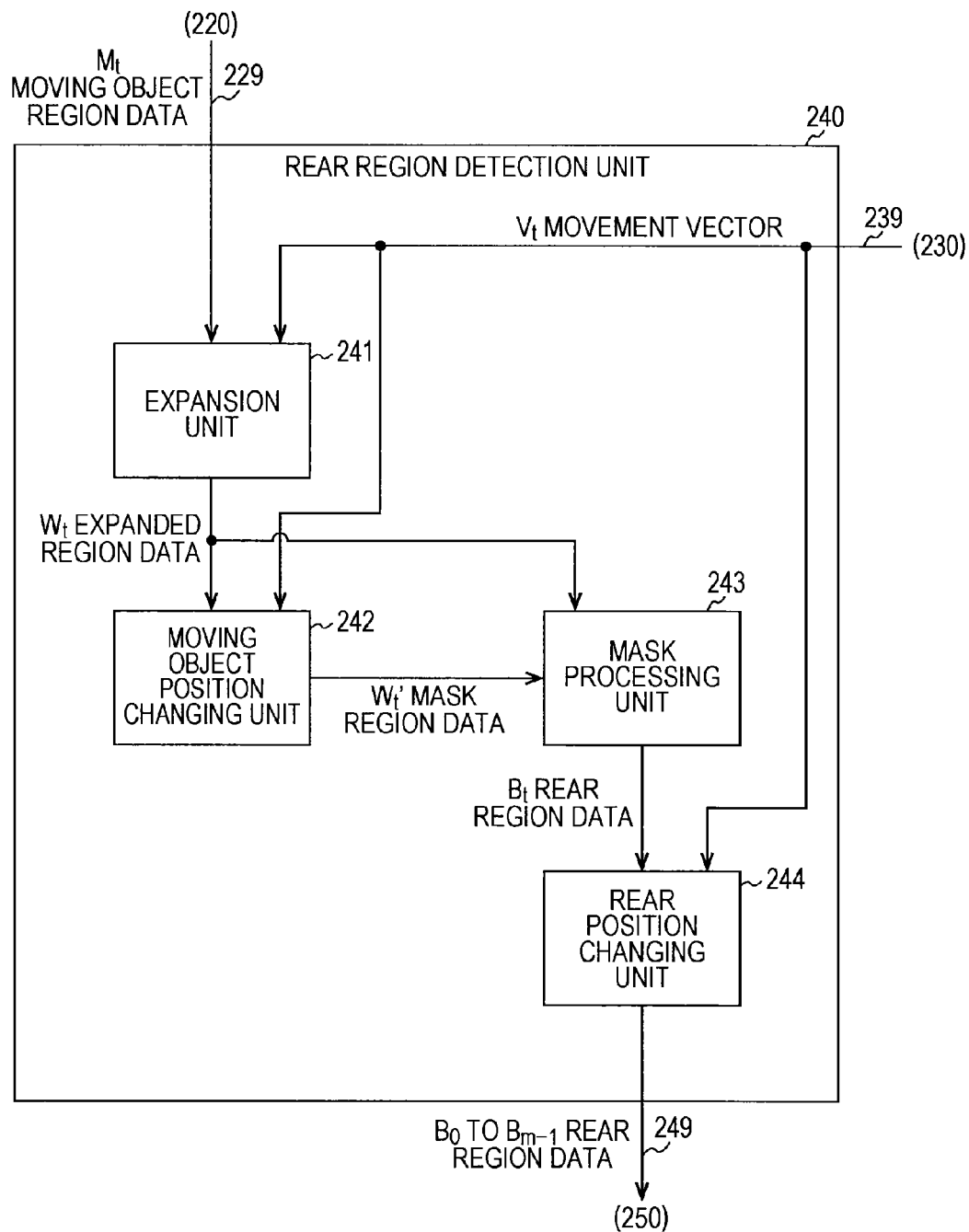
FIG. 18 is a block diagram illustrating a configuration example of a rear region detection unit in the second embodiment.

FIG. 18 is a block diagram illustrating a configuration example of the rear region detection unit 240 of the second embodiment. The rear region detection unit 240 of the second embodiment is different from that of the first embodiment in that a rear position changing unit 244 is further included.

The expansion unit 241 of the second embodiment is different from that of the first embodiment in that one piece of expanded region data $W_t$ is generated instead of n-1 pieces of expanded region data. The moving object position changing unit 242 of the second embodiment is different from that of the first embodiment in that one piece of mask region data $W_t'$ is generated instead of n-1 pieces of mask region data. The mask processing unit 243 of the second embodiment is different from that of the first embodiment in that one piece of rear region data $B_t$ is generated instead of n-1 pieces of rear region data.

The rear position changing unit 244 changes the position of the rear region data $B_t$ along the moving direction. The rear position changing unit 244 generates data of a plurality of rear regions which are different from each other in the moving direction, and outputs the data as rear region data $B_0$ to $B_{m-1}$.

Figure 19:
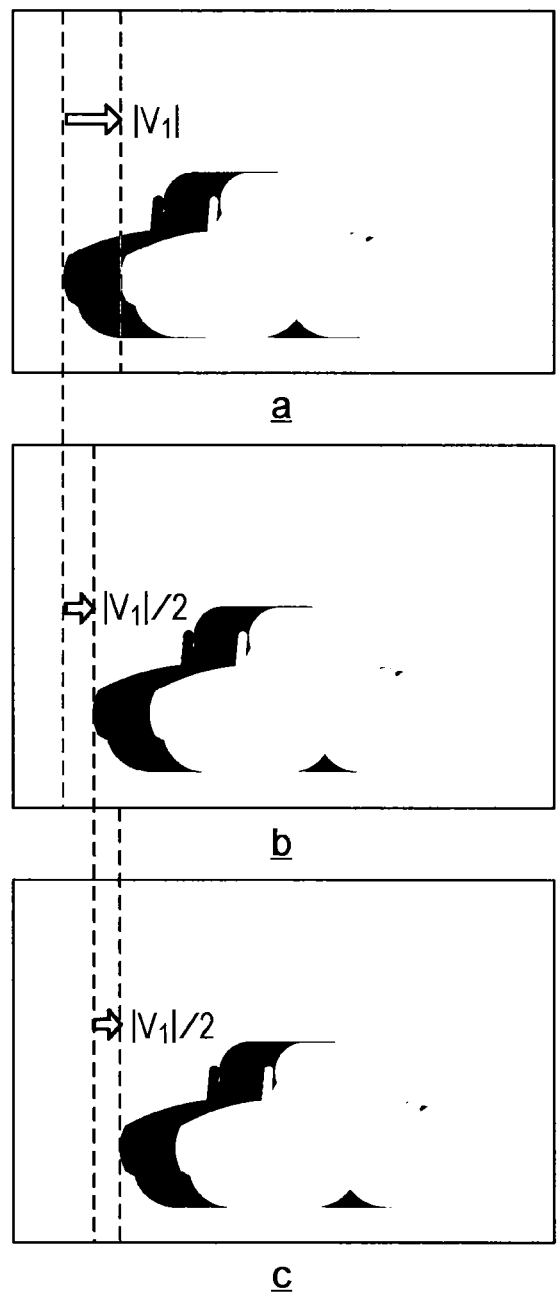
FIG. 19 is a diagram illustrating an example of rear region data in the second embodiment.

FIG. 19 is a diagram illustrating an example of the rear region data in the second embodiment. a of FIG. 19 is rear region data $B_0$ which is generated through a masking process, similarly to the first embodiment. However, in a of FIG. 19, for example, "1" is set as γ indicating the amount in the moving direction of the expanded region.

b of FIG. 19 is rear region data $B_1$ obtained by the rear position changing unit 244 changing the position of the rear region in the rear region data $B_0$ in the moving direction, for example, by only $|V_1|/2$. c of FIG. 19 is rear region data $B_2$ obtained by the rear position changing unit 244 changing the position of the rear region in the rear region data $B_1$ in the moving direction, for example, by only $|V_1|/2$. In addition, the rear region detection unit 240 may detect any one of a plurality of rear regions and output one piece of rear region data. In this case, "1" is set as m. However, when m=1, if only the first rear region data $B_0$ is output, the same result as in the first embodiment is obtained. When m=1, the rear region detection unit 240 outputs rear region data (for example, $B_1$ in b of FIG. 19) which is different from the rear region data $B_0$, such that the rear region which is different from the case of the first embodiment is smoothed, and a different result is obtained.

Figure 20:
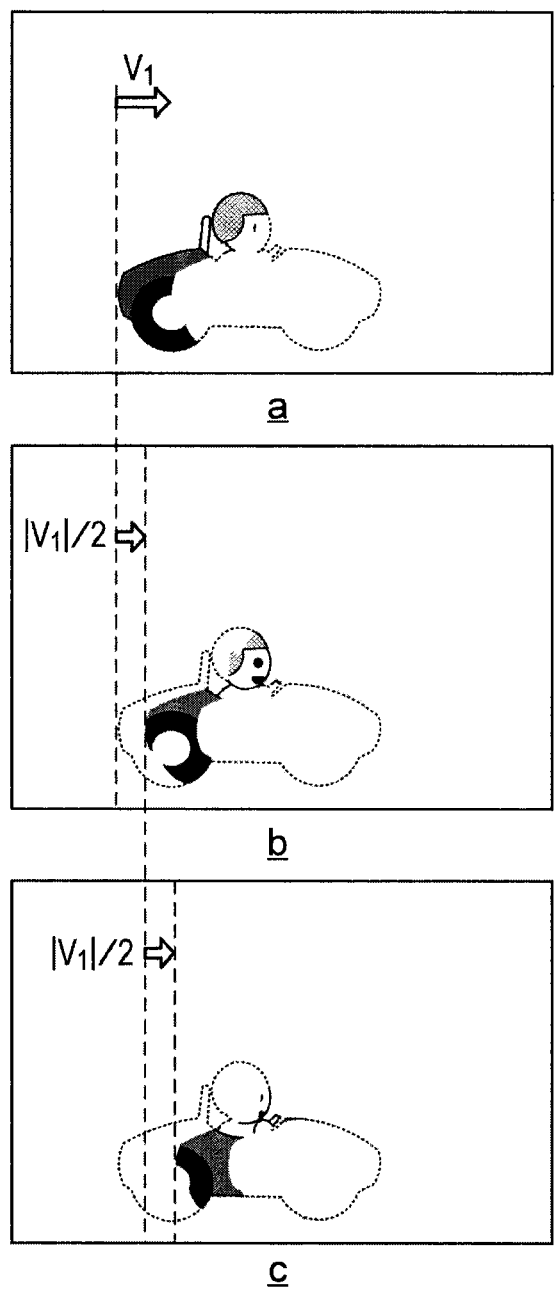
FIG. 20 is a diagram illustrating an example of a rear portion of a moving object in the second embodiment.

FIG. 20 is a diagram illustrating an example of the rear portion of the moving object in the second embodiment. a to c of FIG. 20 are rear portions of the moving object specified by rear region data $B_0$ to $B_3$ illustrated in a to c of FIG. 19. In a of FIG. 20, the region located furthest behind among rear regions in the rear region data $B_0$ to $B_3$ is detected as the rear region. In b of FIG. 20, the region located in front of the rear region of a of FIG. 20 is detected as the rear region. In c of FIG. 20, the region located further in front of the rear region of b of FIG. 20 is detected as the rear region. In this manner, the rear position changing unit 244 changes the position of the rear region obtained through the masking process along the moving direction, such that a plurality of rear regions, which are different from each other, in one moving object are detected.

FIG. 21 is a diagram illustrating an example of output image data of the second embodiment. a to c of FIG. 21 are image data obtained by respectively smoothing the rear regions illustrated in a to c of FIG. 19, with respect to one piece of input image data. Since the smoothed regions are different from each other in the image data, if the image data is continuously replayed, the rear portion seems to flow backwards. Thus, the sensation of speed of the moving object is emphasized.

In this manner, according to the second embodiment of the present technology, the image processing device 200 can generate a moving image configured with a plurality of images in which different rear regions are smoothed by performing the smoothing process on each of a plurality of different rear regions. Thus, a dynamic image is obtained in which the rear region seems to flow.

Modification Example

Although the image processing device 200 in the second embodiment performs the smoothing using the moving average filter, the image processing device 200 may perform the smoothing using a low pass filter. The modification example is different from the second embodiment in that the image processing device 200 of the modification example performs the smoothing using the low pass filter.

Specifically, the smoothing processing unit 250 of the modification example performs the smoothing using a low pass filter having a pass band that is proportional to the value of a trigonometric function that represents a wave traveling in a direction opposite to the movement vector $V_t$. In other words, more specifically, the following process is performed. "a trigonometric function that represents a wave traveling in the direction opposite to the movement vector $V_t$," is assumed as $S(t1, x1, y1)$. Here, the function S is a function by which the value of a wave at a timing t1 and a position (x1, y1) is $S(t1, x1, y1)$. For example, the function S is represented by the following Expression.

[Expression 5]

$$S(t_1, x_1, y_1) = K\sin\left(2\pi\left\{\frac{t_1}{m} + (V_t \cdot Q)\right\}\right), \quad \text{Expression 5}$$

where $Q = (x_1, y_1)$

Here, K is a proportionality constant, and "·" in the Expression represents an inner product. Further, Q is coordinates of (x1, y1) in the output image data. In addition, as a periodic function representing the distribution of pixel values of pixels in the rear region in the direction along the moving direction, the smoothing processing unit 250 may use a function other than the trigonometric function illustrated in Expression 5.

The smoothing processing unit 250 applies a low pass filter to each pixel of input image data $I_t$ present within the rear region designated by the rear region data $B_t$, when creating output image data $O_t$ (t is equal to or greater than 0 and equal to or less than m−1). Specifically, a low pass filter having a pass band which is proportional to S(t, x2, y2) is applied by setting the pixel position of each pixel in $I_t$ to (x2, y2). The output image data $O_0$ to $O_{m-1}$ which has been smoothed in this way is continuously replayed, such that the viewer can feel a wave traveling in the direction opposite to the movement vector $V_t$, in the rear region, and the sensation of speed is further emphasized.

Figure 22:
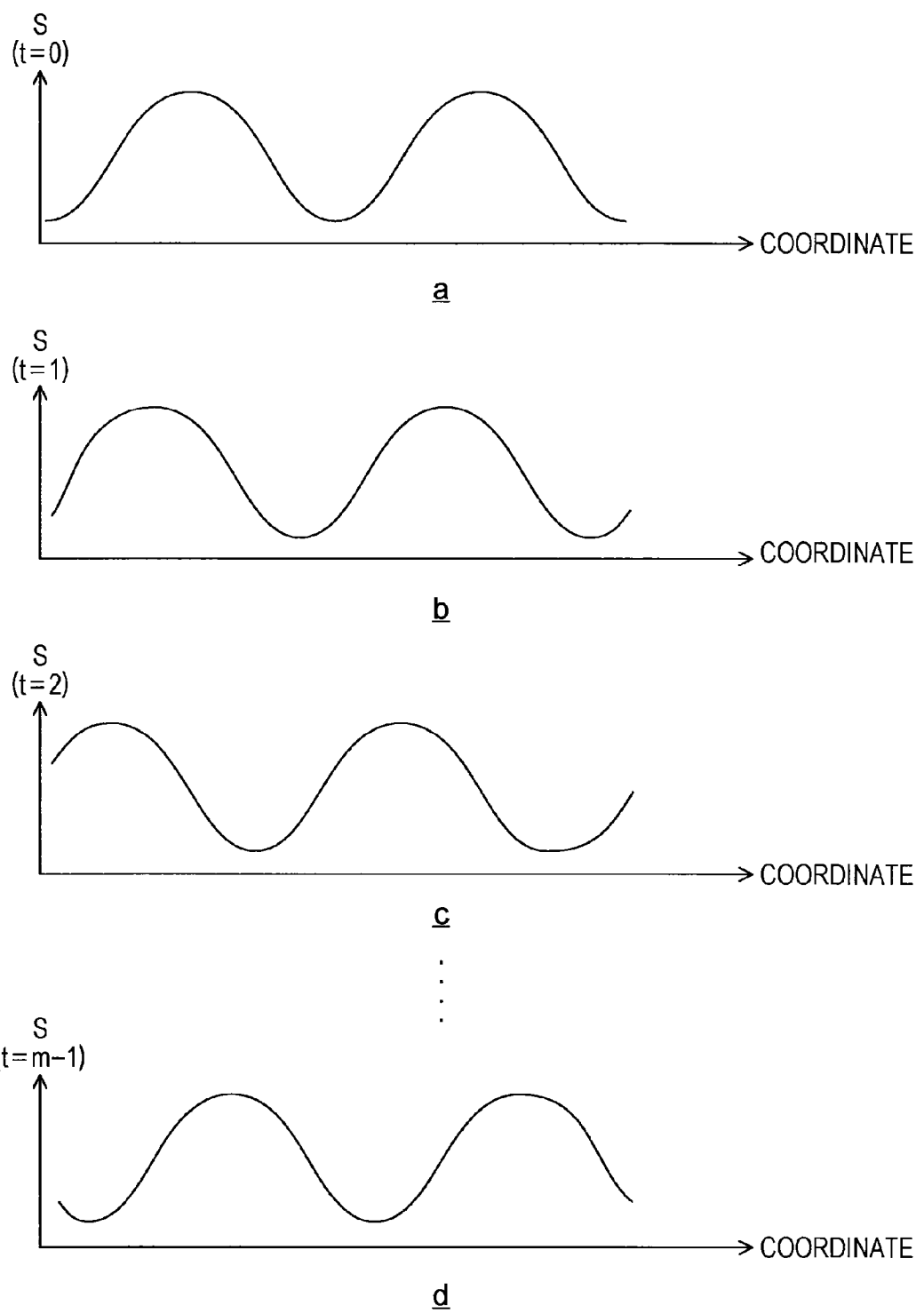
FIG. 22 is a diagram illustrating an example of a trajectory of a function S in a third modification example of the second embodiment.

FIG. 22 is a diagram illustrating an example of a trajectory of a function S in a modification example of the second embodiment. In FIG. 21, the horizontal axis is the coordinates of the pixels along the movement vector, and the vertical axis is the trajectory of the function S at a certain timing. a of FIG. 22 is a trajectory of the function S at t=0, and b is the trajectory of the function S at t=1. Further, c of FIG. 21 is the trajectory of the function S at t=1, and d is the trajectory of the function S at t=m−1.

As illustrated in FIG. 22, if the timing t changes from 0 to m−1, the wave represented by the function S travels in a direction opposite to the movement vector. Further, if the period is m and thus the timing returns to 0 from m−1 and repeats, the function is a wave traveling in the direction opposite to the movement vector, always, without being interrupted. Then, the image processing device 200 applies a low pass filter having a pass band of a size corresponding to the amplitude of the function S, to the pixel of the input image data $I_t$. Specifically, when the amplitude of the function S is great, the image processing device 200 applies a low pass filter having a broad pass band to the pixel of the input image data $I_t$ (in other words, a smoothing is not performed excessively). In contrast, when the amplitude of the function S is small, a low pass filter having a narrow pass band is applied to the pixel of the input image data $I_t$ (in other words, considerable smoothing is performed). If the output image data $O_0$ to $O_{m-1}$, to which the low pass filter is applied, is continuously replayed, a pattern which is smoothed to a degree corresponding to the amplitude of the function S flows in a backward direction, and thus the sensation of speed is further emphasized.

3. Third Embodiment

Configuration Example of Image Processing Device

Figure 23:
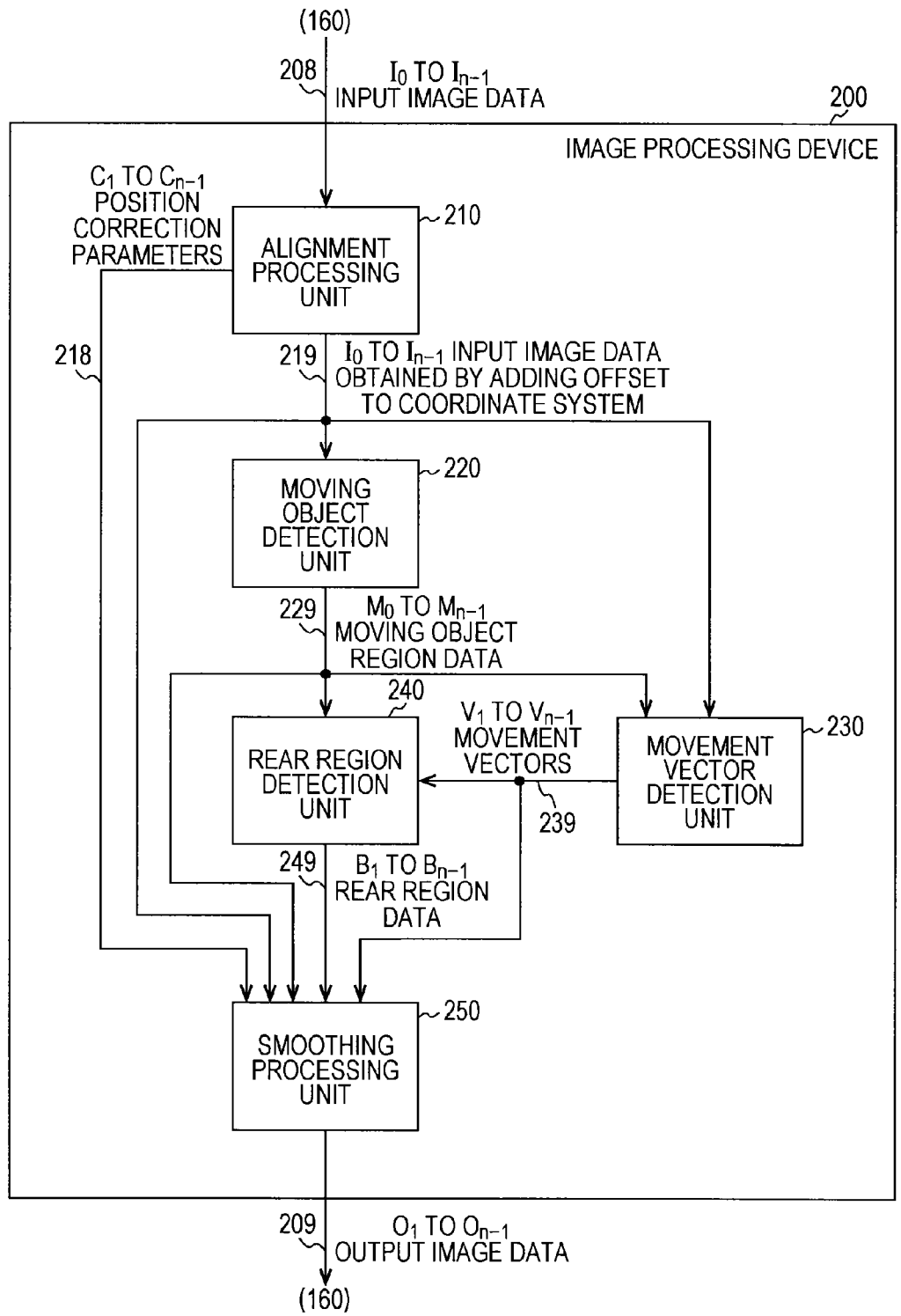
FIG. 23 is a block diagram illustrating a configuration example of an image processing device in a third embodiment.
Figure 24:
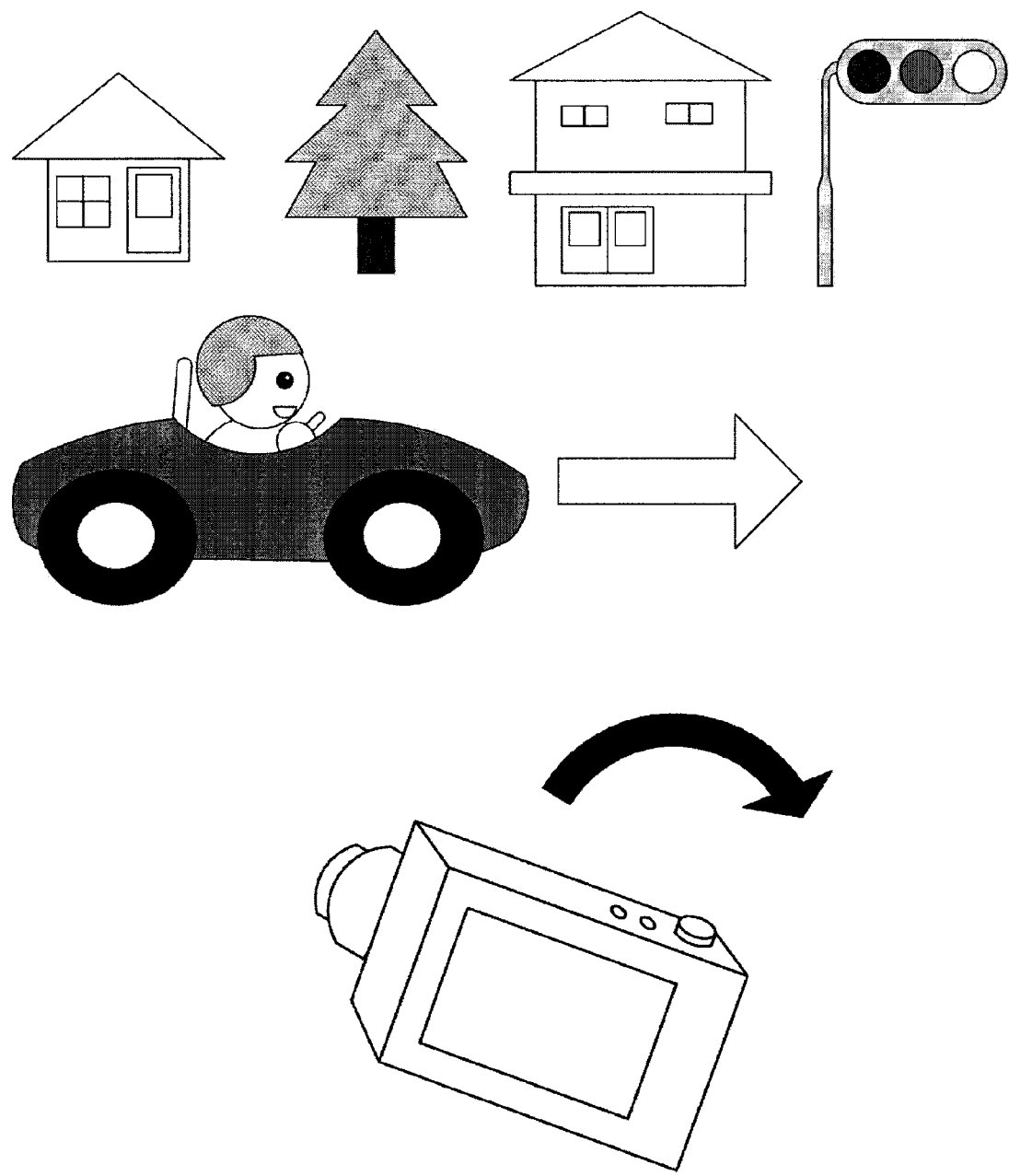
FIG. 24 is a diagram describing an imaging method of moving image data in the third embodiment.

FIG. 23 is a block diagram illustrating a configuration example of the image processing device 200 in the third embodiment. In the first embodiment, the image processing device 200 detects the moving object under the assumption that the photographer captures an image without moving the imaging equipment during image capturing of the input image data. However, in some cases, the photographer captures an image while moving the imaging equipment itself during image capturing. For example, as illustrated in FIG. 24, in some cases, the photographer moves (pans) the imaging equipment in the moving direction, while following the movement of the moving object. Depending on the speed of movement of the imaging equipment, as is apparent in the screen, in some cases, moving image data is captured in which the moving object does not move and the still object moves. If the method of detecting a moving object, as it is, illustrated in the first embodiment is directly applied with respect to the moving image data, an object, which is not a moving object, may be detected as the moving object by mistake.

In order to suppress an erroneous detection of the moving object, the third embodiment is different from the first embodiment in that an image processing device 200 of the third embodiment detects the moving object while correcting a position deviation between input image data due to the movement of imaging equipment, in the input image data. Specifically, as illustrated in FIG. 23, the third embodiment is different from the first embodiment in that the image processing device 200 of the third embodiment further includes an alignment processing unit 210.

The alignment processing unit 210 performs an alignment process between input image data. Specifically, in order to perform an alignment of the input image data, two processes are performed: a process of calculating "position correction parameters $C_1$ to $C_{n-1}$" and a process of adding an offset to a coordinate system of input image data $I_1$ to $I_{n-1}$ by the "position correction parameters $C_1$ to $C_{n-1}$".

Figure 25:
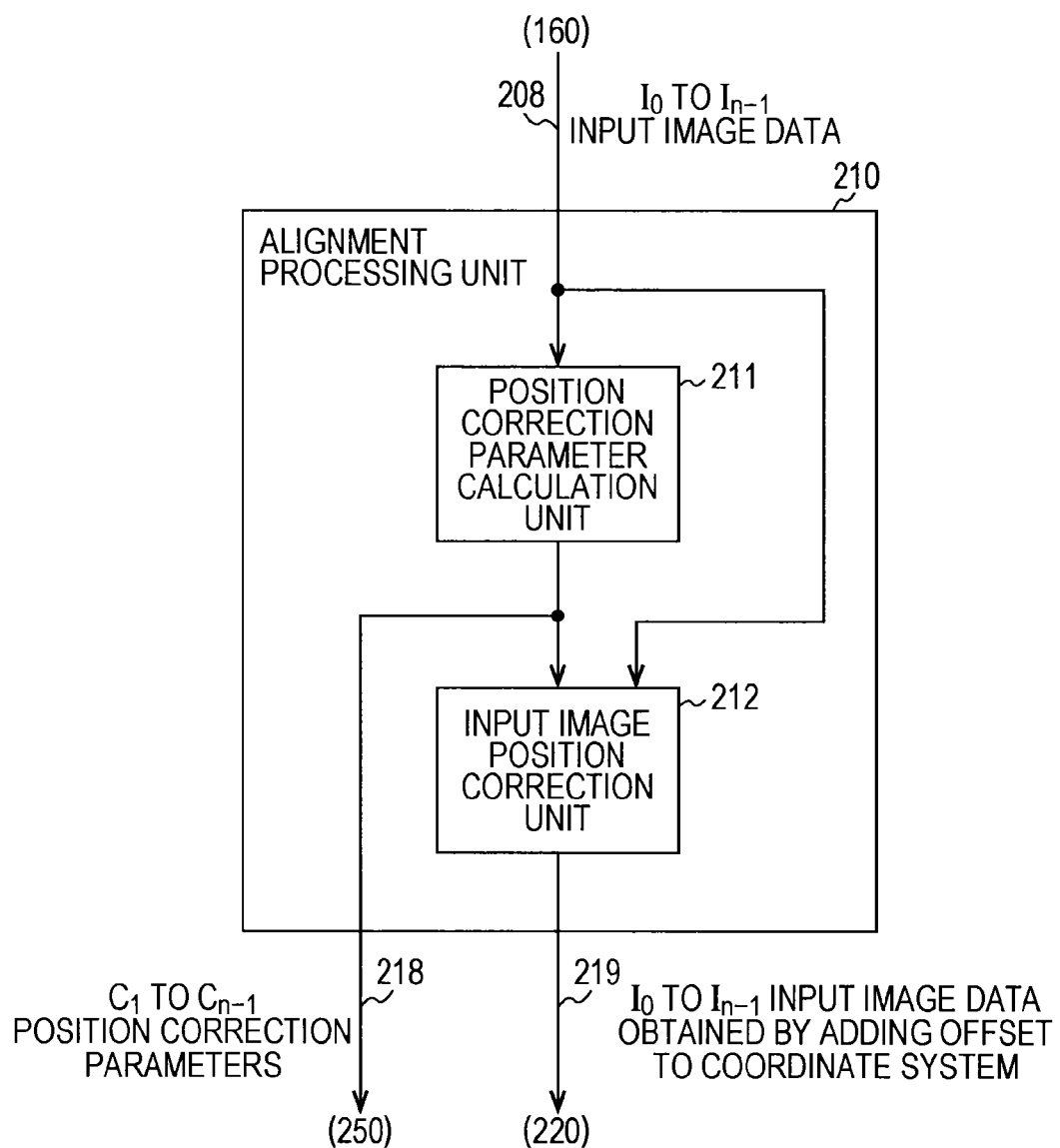
FIG. 25 is a block diagram illustrating a configuration example of an alignment processing unit in the third embodiment.

FIG. 25 is a block diagram illustrating a configuration example of the alignment processing unit 210 in the third embodiment. The alignment processing unit 210 includes a position correction parameter calculation unit 211 and an input image position correction unit 212.

The position correction parameter calculation unit 211 receives input image data $I_0$ and input image data $I_1$ to $I_{n-1}$. Then, the position correction parameter calculation unit 211 calculates "position correction parameters $C_1$ to $C_{n1}$" for performing an alignment of input image data. The "position correction parameter $C_t$" is data indicating which positional relationship the input image data $I_t$ has with respect to the input image data $I_0$. In other words, in view of a coordinate system obtained by offsetting two-dimensional coordinates of input image data $I_t$ by an amount indicated by the position correction parameter $C_t$, "the subject which is projected to the input image data $I_t$ at a certain position (coordinate values) in the coordinate system subjected to an offset" is projected at the same position (coordinate values) as the input image data $I_0$.

In addition, more specifically, for example, "position correction parameter $C_t$" is data including two scalar values: an offset value (scalar value) of an X direction and an offset value (scalar value) of a Y direction.

Such a "position correction parameter $C_t$" can be obtained through a matching calculation between two images of input image data $I_t$ and input image data $I_0$. The matching calculation is a technology which is known in the related art, and thus the detailed description thereof will be omitted.

In other words, the position correction parameter calculation unit 211 performs the matching process of the images of the input image data $I_0$ and the input image data $I_t$ for t=1 to n−1 so as to obtain a deviation amount between two images. Then, the deviation amount is output as "position correction parameter $C_t$".

In addition, in the matching calculation, for example, a phase-only correlation method is used. In the phase-only correlation method, the position correction parameter calculation unit 211 performs a Fourier-transform on images to be compared, obtains the cross power spectrums of the two images from the result of the Fourier-transform, and performs an inverse Fourier transform on the cross power spectrum. Through the inverse Fourier transform, a function of x and y which is steep at some values of x and y is obtained. If the position of the target image is shifted in the x and y directions by the values of x and y at which the function is steep, a target image matches well with the reference image, and thus the position correction parameter calculation unit 211 sets the values as the position correction parameter. The phase-only correlation method is a method which is often used in the alignment process, as described in "B. Srinivasa Reddy and B. N. Chatterji, An FF T-Based Technique for Translation, Rotation, and Scale-Invariant Image Registration, IEEE TRANSACTIONS ON IMAGE PROCESSING 1996."

The input image position correction unit 212 performs a process of making an image on a new coordinate system by adding an offset to the coordinate system of the input image data $I_1$ to $I_{n-1}$.

Through the process of adding the offset, the same subject is projected at the same position (coordinate values) for each of the input image data $I_0$ to $I_{n-1}$. In other words, it is considered as if the image is captured by the photographer without moving the imaging equipment. In other words, it is possible to obtain an input image illustrated in FIG. 26 by adding an offset to the input image of FIG. 25.

FIG. 26 is a diagram illustrating examples of input image data in the third embodiment. a of FIG. 26 is the temporally first input image data $I_0$, and b to d of FIG. 26 are the second to fourth input image data $I_1$ to $I_3$. In b to d of FIG. 26, a vehicle and objects of a background are captured, and the objects of the background move in a horizontal direction by the photographer's panning operation. In contrast, since the moving direction of the vehicle is the same direction as the pan direction, the position between frames may not change significantly.

Figure 27:
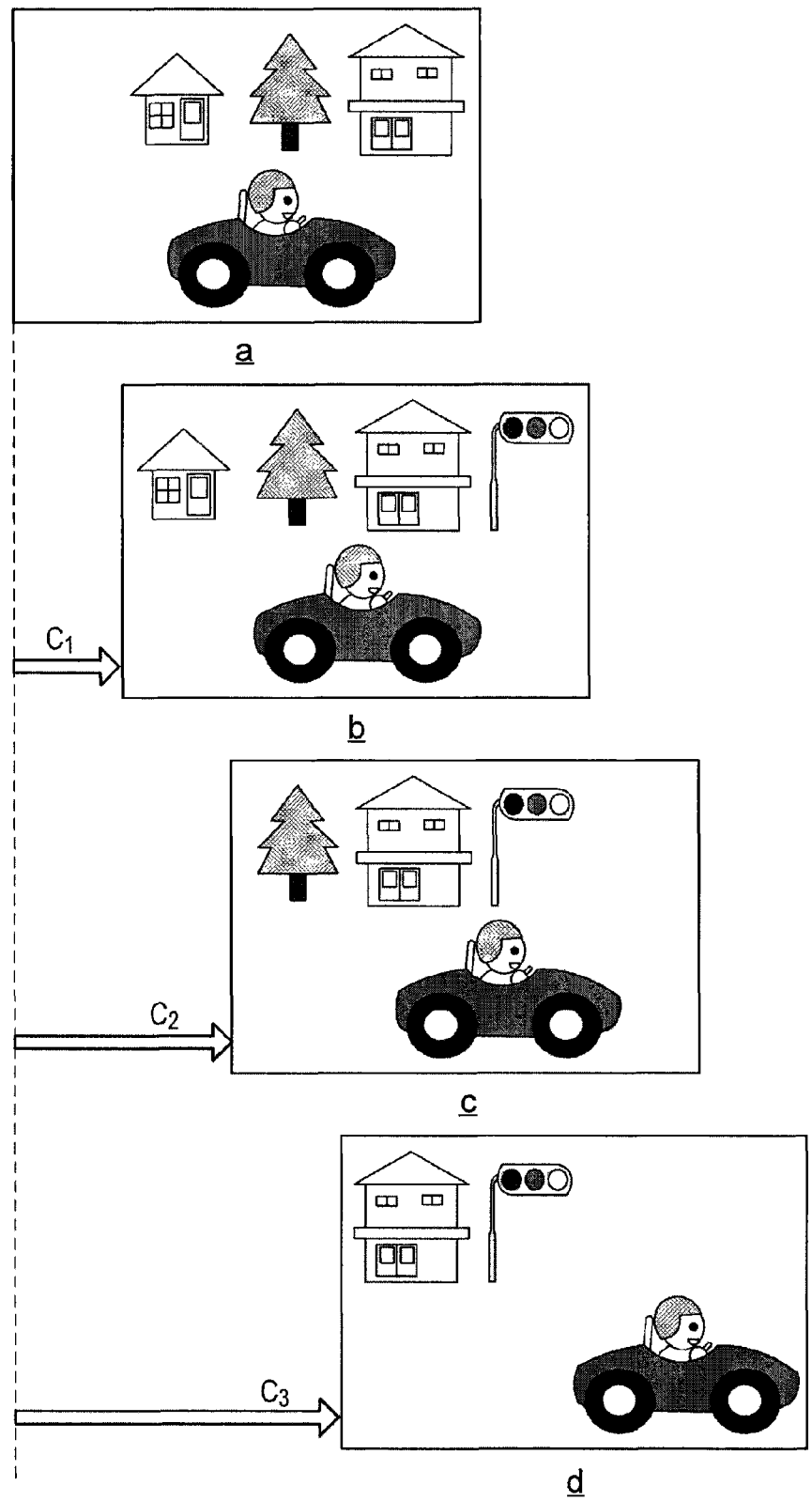
FIG. 27 is a diagram illustrating an example of image data corrected by offsetting a position in the third embodiment.

FIG. 27 is a diagram illustrating an example of image data corrected by offsetting a position in the third embodiment. a of FIG. 27 is the temporally first input image data $I_0$ and is used as a reference image. b of FIG. 27 is the second input image data $I_1$ obtained by offset-correcting the position using a position correction parameter $C_1$ such that the reference image and a common region overlap. c and d of FIG. 27 are respectively the third and fourth input image data $I_2$ and $I_3$ obtained by offset-correcting the position using position correction parameters $C_2$ and $C_3$ such that the reference image and a common region overlap. The image processing device 200 can reliably detect the moving object, by offset-correcting the position as illustrated in FIG. 26.

"A dynamic image in which the sensation of speed of the moving object is emphasized" and which is similar to the result of the first embodiment of the present invention is obtained by performing the same processes (subsequent to 220 of FIG. 23) as those in the first embodiment of the present invention, with respect to the input image data $I_0$ to in the coordinate system which is offset. Further, in the third embodiment, "the dynamic image in which the sensation of speed is further emphasized" is obtained by adding a process which is not present in the first embodiment of the present invention. This will be explained below.

The third embodiment (FIG. 23) of the present invention is different from the first embodiment (FIG. 2) of the present invention in that the alignment processing unit 210 is added, and data which is input to the alignment processing unit 210 is different. Specifically, the third embodiment is different from the first embodiment in that the information regarding "position correction parameters $C_1$ to $C_{n-1}$" which are obtained in the alignment processing unit 210 and the moving object region data $M_0$ to $M_{n-1}$ which is extracted in the moving object detection unit 220 are input to the smoothing processing unit 250.

FIG. 27 is a block diagram illustrating a configuration example of the smoothing processing unit 250 in the third embodiment. The smoothing processing unit 250 includes a rear region smoothing processing unit 251 and a background region smoothing processing unit 252.

The rear region smoothing processing unit 251 performs the smoothing process on the rear region depending on the moving speed. The rear region smoothing processing unit 251 supplies the input image data which is obtained by performing the smoothing process, to the background region smoothing processing unit 252.

The background region smoothing processing unit 252 performs the smoothing process on the region of the background along a correction direction, depending on a correction amount indicated by the position correction parameter. Specifically, the background region smoothing processing unit 252 extracts the region of the background other than the region of the moving object, based on the moving object region data, in the input image data in which the rear region is smoothed. Then, the background region smoothing processing unit 252 calculates the size (correction amount) of a correction vector from the position correction parameter. More specifically, the size of pan during the capturing of the input image data $I_t$ is obtained from the difference between two consecutive position correction parameters $C_t$ and $C_{t-1}$, and the value is taken as the correction amount. In addition, $C_0$ is set to 0. The background region smoothing processing unit 252 performs the smoothing process on the region of the background along the direction of the correction vector, by setting the correction amount×α' as a degree of smoothing K. Here, it is desirable that the value of the coefficient α' be set to a smaller value (for example, "1/10") as compared to the coefficient α (for example, "1") which is set in the case of smoothing the rear region. The background region smoothing processing unit 252 outputs the image data which is obtained through the smoothing process as the output image data.

Figure 28:
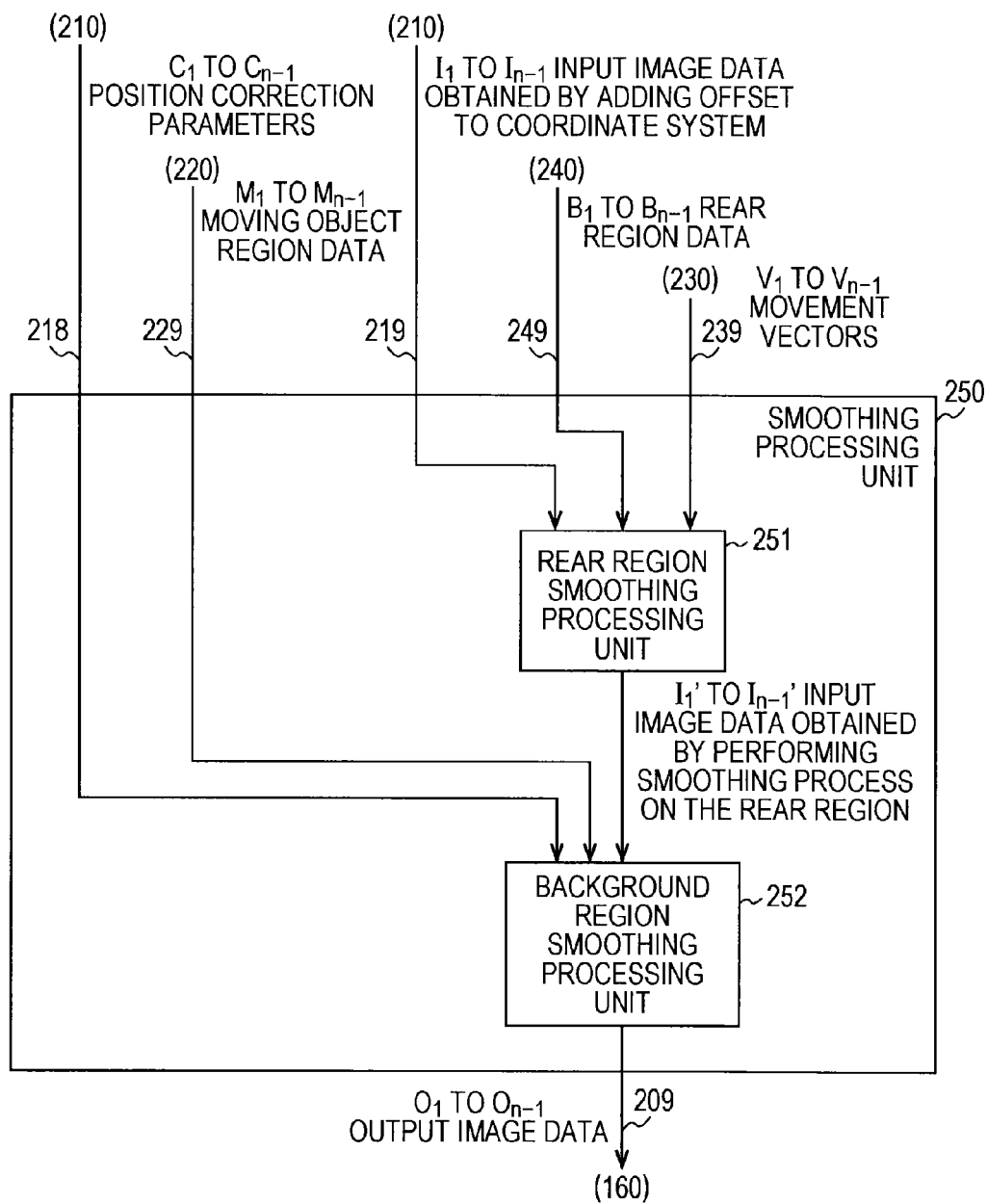
FIG. 28 is a block diagram illustrating a configuration example of a smoothing processing unit in the third embodiment.

FIG. 29 is a diagram illustrating an example of output image data in the third embodiment. a of FIG. 29 is an example of input image data $I_1'$ which is a result obtained by performing the smoothing process on the rear region along the moving direction. b of FIG. 29 is an example of output image data $O_1$ which is a result obtained by performing the smoothing process on the background of the moving object along the correction direction (the direction of pan). As illustrated in b of FIG. 28, the rear region of the moving object is smoothed along the moving direction and the background is smoothed along the direction of pan, such that an image, in which the sensation of motion of the moving object is emphasized, is obtained.

In this manner, according to the third embodiment of the present technology, the image processing device 200 can detect the region of the moving object after aligning the position of the target image at the position of the reference image such that the reference image and the target image overlap in a common region. Thus, even when the imaging equipment is moved, the region of the moving object is reliably detected. Then, the direction of pan of a camera can be ascertained from the position correction parameter, and it is possible to achieve a so-called panning effect by performing a slight smoothing on the "region of the background other than the region of the moving object" along the direction. Due to the panning effect, "the dynamic image in which the sensation of speed is emphasized" furthermore is obtained.

In addition, the embodiments described above illustrate an example of implementing the present technology, and the matters in the embodiment and the subject matter in the claims respectively have correspondences. Similarly, the subject matter in the claims and the matters in the embodiment of the present technology named in the same manner respectively have correspondences. However, the present technology is not limited to the embodiment, and it may be embodied by various modifications to the embodiment without departing from the scope and spirit thereof.

Further, the processing procedures described in the embodiment described above may be regarded as a method having a series of procedures, or may be regarded as a program for causing a computer to execute the series of procedures or a recording medium that stores the program. As the recording medium, it is possible to use, for example, a Compact Disc (CD), a MiniDisc (MD), a Digital Versatile Disc (DVD), a memory card, a Blu-ray Disc (registered trademark) and the like.

Further, the present technology can take the following configurations.

(1) An image processing device including:
a moving object acquisition unit that acquires a region of a moving object in a target image which is at least one image among a plurality of images which are temporally consecutive;
a moving direction acquisition unit that acquires a moving direction of the moving object;
a rear region detection unit that detects a region of a rear portion with respect to the moving direction in the region of the moving object, as a rear region; and
a rear region processing unit that performs a predetermined image process on the rear region.

(2) The image processing device according to (1),
wherein the moving object acquisition unit detects the region of the moving object in the target image.

(3) The image processing device according to (2),
wherein the target image includes a plurality of blocks of a predetermined shape, and
wherein the moving object acquisition unit obtains a movement amount of the block for each block using a block matching algorithm and detects a region configured with blocks each of which the movement amount exceeds a predetermined threshold, as the region of the moving object.

(4) The image processing device according to any one of (1) to (3),
wherein the moving object acquisition unit further acquires the region of the moving object in a reference image which is the immediately preceding image with respect to the target image among the plurality of images, and
wherein the moving direction acquisition unit detects a direction from specific coordinates within the region of the moving object in the reference image to specific coordinates within the region of the moving object in the target image, as the moving direction.

(5) The image processing device according to any one of (1) to (4),
wherein the rear region detection unit detects a region surrounded by an outline of the rear portion of which a position is changed within the target image in the moving direction and the outline before the change, as the rear region.

(6) The image processing device according to any one of (1) to (5),
wherein the rear region detection unit detects a region generated by masking the region of the moving object before the change as the rear region, by setting the region of the moving object of which a position is changed in the moving direction within the target image as a mask region.

(7) The image processing device according to (6),
wherein the rear region detection unit include a moving speed detection unit that detects a moving speed of the moving object, and a mask processing unit that performs the masking by setting the region of the moving object of which the position is changed according to an amount of change depending on the moving speed as the mask region.

(8) The image processing device according to (7),
wherein the rear region detection unit further includes an expansion unit that expands the region of the moving object in the target image in the moving direction, and
wherein the mask processing unit performs the masking on the expanded region before the change by setting a region obtained by changing a position of an expanded region in the moving direction as the mask region, the expanded region being the region of the moving object expanded by the expansion unit.

(9) The image processing device according to any one of (1) to (8),
wherein the predetermined image process is a smoothing process along the moving direction.

(10) The image processing device according to (9),
wherein the rear region processing unit performs the smoothing process to a degree depending on the moving speed along the moving direction on the rear region.

(11) The image processing device according to (9) or (10),
wherein the expansion unit expands the region of the moving object in the moving direction depending on the moving speed.

(12) The image processing device according to any one of (9) to (11),
wherein the rear region processing unit performs the smoothing process, using a low pass filter having a pass band with a width corresponding to an amplitude of a periodic function representing a distribution of pixel values within the rear region in the direction along the moving direction.

(13) The image processing device according to any one of (1) to (12),
wherein the target image is any one among the plurality of images,
wherein the rear region detection unit detects a plurality of the rear regions in a rear portion of the moving object, and
wherein the rear region processing unit generates a plurality of images obtained by performing the predetermined image process on a plurality of the rear regions.

(14) The image processing device according to any one of (1) to (13), further including:
an alignment processing unit that aligns a position of the target image to a position of the reference image such that the reference image that is the immediately preceding image with respect to the target image and the target image overlap in a common region, wherein the moving object detection unit detects the moving object in the aligned target image.

(15) The image processing device according to any one of (1) to (14), wherein the smoothing processing unit further performs the smoothing process on a region other than the moving object in the target image along the moving direction to a degree different from a degree of the rear region.

(16) The image processing device according to any one of (1) to (15), further including:

an emphasis processing unit that emphasizes lines drawn along the moving direction among lines included in the rear region.

(17) The image processing device according to any one of (1) to (16), wherein the predetermined image process is a process of coloring the rear region with a predetermined color.

(18) A control method of an image processing device including:

a moving object acquisition step of acquiring a region of a moving object in a target image which is at least one image among a plurality of images which are temporally consecutive;

a moving direction acquisition step of acquiring a moving direction of the moving object;

a rear region detection step of detecting a region of a rear portion with respect to the moving direction in the region of the moving object, as a rear region; and a rear region processing step of performing a predetermined image process on the rear region.

(19) A program causing a computer to execute:

a moving object acquisition step of acquiring a region of a moving object in a target image which is at least one image among a plurality of images which are temporally consecutive;

a moving direction acquisition step of acquiring a moving direction of the moving object;

a rear region detection step of detecting a region of a rear portion with respect to the moving direction in the region of the moving object, as a rear region; and a rear region processing step of performing a predetermined image process on the rear region.

REFERENCE SIGNS LIST

100 INFORMATION PROCESSING APPARATUS
110 IMAGING UNIT
120 CONTROL UNIT
130 DISPLAY UNIT
140 INPUT AND OUTPUT INTERFACE
150 MOVING IMAGE DATA STORAGE UNIT
160 BUS
200 IMAGE PROCESSING DEVICE
210 ALIGNMENT PROCESSING UNIT
211 POSITION CORRECTION PARAMETER CALCULATION UNIT
212 INPUT IMAGE POSITION CORRECTION UNIT
220 MOVING OBJECT DETECTION UNIT
221 PIXEL SELECTION UNIT
222 BACKGROUND REFERENCE VALUE CALCULATION UNIT
223 MOVING OBJECT REGION EXTRACTION UNIT
225 MOVING OBJECT ACQUISITION UNIT
230 MOVEMENT VECTOR DETECTION UNIT
231 CENTROID COORDINATES CALCULATION UNIT
232 MOVEMENT VECTOR CALCULATION UNIT
235 MOVEMENT VECTOR ACQUISITION UNIT
240 REAR REGION DETECTION UNIT
241 EXPANSION UNIT
242 MOVING OBJECT POSITION CHANGING UNIT
243 MASK PROCESSING UNIT
244 REAR POSITION CHANGING UNIT
250 SMOOTHING PROCESSING UNIT
251 REAR REGION SMOOTHING PROCESSING UNIT
252 BACKGROUND REGION SMOOTHING PROCESSING UNIT
255 REAR REGION PROCESSING UNIT
260 EDGE EMPHASIS PROCESSING UNIT

The invention claimed is:

1. An image processing device comprising:
one or more processors configured to:
acquire a region of a moving object in a target image which is at least one image among a plurality of images which are temporally consecutive;
acquire a moving direction of the moving object;
detect a region of a rear portion with respect to the moving direction in the region of the moving object, as a rear region; and
perform a predetermined image process on the rear region.

2. The image processing device according to claim 1, wherein the one or more processors are configured to detect the region of the moving object in the target image.

3. The image processing device according to claim 2,
wherein the target image includes a plurality of blocks of a predetermined shape, and
wherein the one or more processors are configured to obtain a movement amount of each block of the plurality of blocks using a block matching algorithm and detect a region configured with blocks for each of which the movement amount exceeds a predetermined threshold, as the region of the moving object.

4. The image processing device according to claim 1,
wherein the one or more processors are configured to acquire the region of the moving object in a reference image which is the immediately preceding image with respect to the target image among the plurality of images, and
wherein the one or more processors are configured to detect a direction from specific coordinates within the region of the moving object in the reference image to specific coordinates within the region of the moving object in the target image, as the moving direction.

5. The image processing device according to claim 1,
wherein the one or more processors are configured to detect a region surrounded by an outline of the rear portion of which a position is changed within the target image in the moving direction and the outline before the change, as the rear region.

6. The image processing device according to claim 1,
wherein the one or more processors are configured to detect a region generated by masking the region of the moving object before being changed as the rear region, by setting the region of the moving object of which a position is changed in the moving direction within the target image as a mask region.

7. The image processing device according to claim 6,
wherein the one or more processors are configured to:
detect a moving speed of the moving object, and
perform the masking by setting the region of the moving object of which the position is changed according to an amount of change depending on the moving speed as the mask region.

8. The image processing device according to claim 7, wherein the one or more processors are configured to:
expand the region of the moving object in the target image in the moving direction, and
perform the masking on the expanded region before the change by setting a region obtained by changing a position of an expanded region in the moving direction as the mask region, the expanded region being the region of the moving object.

9. The image processing device according to claim 8, wherein the predetermined image process is a smoothing process along the moving direction.

10. The image processing device according to claim 9, wherein the one or more processors are configured to perform the smoothing process to a degree depending on the moving speed along the moving direction, on the rear region.

11. The image processing device according to claim 9, wherein the one or more processors are configured to expand the region of the moving object in the moving direction depending on the moving speed.

12. The image processing device according to claim 9, wherein the one or more processors are configured to perform the smoothing process, using a low pass filter having a pass band with a width corresponding to an amplitude of a periodic function representing a distribution of pixel values within the rear region in the direction along the moving direction.

13. The image processing device according to claim 1,
wherein the target image is any one among the plurality of images,
wherein the one or more processors are configured to:
detect a plurality of rear regions in a rear portion of the moving object, and
generate a plurality of images obtained by performing the predetermined image process on the plurality of rear regions.

14. The image processing device according to claim 1, wherein the one or more processors are configured to:
align a position of the target image to a position of the reference image such that the reference image that is the immediately preceding image with respect to the target image and the target image overlap in a common region,
detect the moving object in the aligned target image.

15. The image processing device according to claim 1,
wherein the one or more processors are configured to perform the smoothing process on a region other than the moving object in the target image along the moving direction to a degree different from a degree of the rear region.

16. The image processing device according to claim 1, wherein the one or more processors are configured to:
emphasize lines drawn along the moving direction among lines included in the rear region.

17. The image processing device according to claim 1, wherein the predetermined image process is a process of coloring the rear region with a predetermined color.

18. A control method of an image processing device comprising:
acquiring a region of a moving object in a target image which is at least one image among a plurality of images which are temporally consecutive;
acquiring a moving direction of the moving object;
detecting a region of a rear portion with respect to the moving direction in the region of the moving object, as a rear region; and
performing a predetermined image process on the rear region.

19. A non-transitory computer-readable storage medium having stored thereon, a set of computer-executable instructions for causing a computer to perform steps comprising:
acquiring a region of a moving object in a target image which is at least one image among a plurality of images which are temporally consecutive;
acquiring a moving direction of the moving object;
detecting a region of a rear portion with respect to the moving direction in the region of the moving object, as a rear region; and
performing a predetermined image process on the rear region.

* * * * *